US008793373B2

(12) United States Patent
Nakama

(10) Patent No.: US 8,793,373 B2
(45) Date of Patent: Jul. 29, 2014

(54) NETWORK SYSTEM AND METHOD FOR OPERATING THE SAME

(71) Applicant: Hitachi, Ltd., Tokyo (JP)

(72) Inventor: Hironori Nakama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/981,228

(22) PCT Filed: Dec. 6, 2012

(86) PCT No.: PCT/JP2012/081656

§ 371 (c)(1),
(2), (4) Date: Jul. 23, 2013

(87) PCT Pub. No.: WO2014/087518

PCT Pub. Date: Jun. 12, 2014

(65) Prior Publication Data

US 2014/0164621 A1 Jun. 12, 2014

(51) Int. Cl.
*G06F 15/173* (2006.01)

(52) U.S. Cl.
USPC .......... 709/224

(58) Field of Classification Search
USPC .......... 711/203
See application file for complete search history.

(56) References Cited

U.S. PATENT DOCUMENTS

| | | | |
|---|---|---|---|
| 2003/0236884 A1 | 12/2003 | Yamamoto et al. |
| 2005/0278489 A1 | 12/2005 | Otani |
| 2006/0015529 A1 | 1/2006 | Yagawa |
| 2007/0112875 A1 | 5/2007 | Yagawa |
| 2010/0125715 A1 | 5/2010 | Takamatsu et al. |
| 2010/0153947 A1 | 6/2010 | Haruma |
| 2010/0235832 A1 | 9/2010 | Rajagopal et al. |

FOREIGN PATENT DOCUMENTS

| | | | |
|---|---|---|---|
| JP | 2003-345631 A | 12/2003 |
| JP | 2006-003973 A | 1/2006 |
| JP | 200631668 A | 2/2006 |
| JP | 2010-122814 A | 6/2010 |
| JP | 2010-140273 A | 6/2010 |
| JP | 2012-128756 A | 7/2012 |

*Primary Examiner* — Jerry Dennison
(74) *Attorney, Agent, or Firm* — Volpe and Koenig, P.C.

(57) ABSTRACT

In a network system, a storage configuration information of a storage resource as a data storage destination and a VM resource information related to a VM as storage resource allocation destination are gathered so as to provide storage resources matching the VM characteristics to the VM. Then, based on the gathered storage configuration information, storage areas corresponding to storage tiers having different characteristics are formed, and the storage tier of the storage area allocated to the VM via the VM resource information is specified.

10 Claims, 20 Drawing Sheets

| Model Rank | Model Name |
|---|---|
| High-end | SSS··· |
| | SSA··· |
| | SAA··· |
| | ⋮ |
| Mid-range | BBB··· |
| | BBC··· |
| | BCC··· |
| | ⋮ |
| Archive | ARC··· |
| | ⋮ |

| LU Number | Model Rank | Media Rank |
|---|---|---|
| LU 00 | High-end | A |
| LU 01 | High-end | B |
| LU 02 | High-end | C |
| ⋮ | ⋮ | ⋮ |
| LU 09 | Mid-range | A |
| LU 10 | Mid-range | B |
| ⋮ | ⋮ | ⋮ |
| LU 20 | Archive | C |
| ⋮ | ⋮ | ⋮ |
| LU 22 | No model info | B |
| ⋮ | ⋮ | ⋮ |

FIG.11

1100 (1101: Model Rank rows; 1102: Media Rank columns; 1110: tier cells)

| Model Rank \ Media Rank | A | B | C |
|---|---|---|---|
| High-end | Tier 0 | Tier 1 | Tier 2 |
| Mid-range | Tier 0.5 | Tier 1.5 | Tier 2.5 |
| Archive | Tier 3 | Tier 3 | Tier 3 |
| No model info | Tier 0.5 | Tier 1.5 | Tier 3 |

| LU Number (1201) | Model Rank (1202) | Media Rank (1203) | LU Tier Rank (1204) |
|---|---|---|---|
| LU 00 | High-end | A | Tier 0 (1211) |
| LU 01 | High-end | B | Tier 1 |
| LU 02 | High-end | C | Tier 2 |
| ⋮ | ⋮ | ⋮ | ⋮ |
| LU 09 | Mid-range | A | Tier 0.5 |
| LU 10 | Mid-range | B | Tier 1.5 (1212) |
| ⋮ | ⋮ | ⋮ | ⋮ |
| LU 20 | Archive | C | Tier 3 (1213) |
| ⋮ | ⋮ | ⋮ | ⋮ |
| LU 22 | No model info | B | Tier 1.5 (1214) |
| ⋮ | ⋮ | ⋮ | ⋮ |

| Virtual CPU (MHz) Allocation Share (1401) | Virtual CPU Share Rank (1402) |
|---|---|
| Less than 5 % | Low |
| 5 % or more and less than 20 % | Normal |
| 20 % or more | High |

1410

| Virtual Memory Capacity (GB) Allocation Share (1411) | Virtual Memory Share Rank (1412) |
|---|---|
| Less than 5 % | Low |
| 5 % or more and less than 20 % | Normal |
| 20 % or more | High |

| VM Number (1501) | Virtual CPU Share Rank (1502) | Virtual Memory Share Rank (1503) | |
|---|---|---|---|
| VM 00 | High | High | 1511 |
| VM 01 | Normal | High | 1512 |
| VM 02 | High | Normal | |
| VM 03 | Normal | Normal | 1513 |
| VM 04 | Normal | Low | |
| VM 05 | Low | Normal | 1514 |
| ⋮ | ⋮ | ⋮ | |

| Virtual Memory Share Rank \ Virtual CPU Share Rank | High | Normal | Low |
|---|---|---|---|
| High | Tier 0 | Tier 0.5 | Tier 1 |
| Normal | Tier 0.5 | Tier 1 | Tier 1.5 |
| Low | Tier 1 | Tier 1.5 | Tier 2 |

| VM Number | Virtual CPU Share Rank | Virtual Memory Share Rank | VM Tier Rank |
|---|---|---|---|
| VM 00 | High | High | Tier 0 |
| VM 01 | Normal | High | Tier 0.5 |
| VM 02 | High | Normal | Tier 0.5 |
| VM 03 | Normal | Normal | Tier 1 |
| VM 04 | Normal | Low | Tier 1.5 |
| VM 05 | Low | Normal | Tier 1.5 |
| VM 06 | Low | Low | Tier 2 |
| ⋮ | ⋮ | ⋮ | ⋮ |

2000

| VM Number (2001) | Virtual CPU Share Rank (2002) | Virtual Memory Share Rank (2003) | VM Tier Rank (2004) | LU Tier Rank (2005) | Storage Destination LU Number (2006) |
|---|---|---|---|---|---|
| VM 00 | High | High | Tier 0 | Tier 0 | LU00, LU03, LU06 |
| VM 01 | Normal | High | Tier 0.5 | Tier 0.5 | LU09, LU12, LU15 |
| VM 02 | High | Normal | Tier 0.5 | Tier 1 | LU01, LU04, LU07 |
| VM 03 | Normal | Normal | Tier 1 | Tier 1 | LU25, LU28, LU31 |
| VM 04 | Normal | Low | Tier 1.5 | Tier 1.5 | LU10, LU13, LU16 |
| VM 05 | Low | Normal | Tier 1.5 | Tier 2 | LU15, LU16, LU17 |
| VM 06 | Low | Low | Tier 2 | Tier 3 | LU35, LU36, LU37 |
| ⋮ | ⋮ | ⋮ | ⋮ | ⋮ | ⋮ |

2011 2012 2013 2014

NETWORK SYSTEM AND METHOD FOR OPERATING THE SAME

TECHNICAL FIELD

The present invention relates to a network system for allocating storage resources to a host system, and the method for operating the same.

BACKGROUND ART

Recently, along with the increase in demands regarding cloud services in the society, the amount of information handled in network systems are increasing, and along therewith, the capacities of storages required for storing data are also increasing significantly.

Storage service providers (SSP) have introduced additional storage systems for satisfying the capacity of storages requested from end users, and have enhanced the network systems. In SSP, the simple additional introduction of storage systems for increasing capacities is not enough, and it is necessary to provide requested amounts of storage resources satisfying conditions such as performance and reliability required by the end users in a speedy manner.

Patent document 1 discloses methods and systems for providing storage virtualization of physical storage system when allocating storage resources to a virtual machine (hereinafter abbreviated as VM) operating in a physical host system. The present methods and systems allocate to the VM storage resources satisfying the requirements of the performance and the capacity (quota) of the storage required in the storage resource allocation request from the VM.

Further, patent document 2 discloses a technique for efficiently assigning storage resources to storage areas in a well-balanced manner in terms of performance and capacity. The art disclosed in patent document 2 relates to a storage system and a method for operating the same, in which the disclosed storage system retains performance information representing the I/O performance of storage devices such as HDDs (Hard Disk Drives) constituting array groups and capacity information representing the storage capacity of storage devices, wherein the system receives a performance requirement information and a capacity requirement information requested in the storage area, and selects a storage device satisfying the requirements.

CITATION LIST

[Patent Literature]

[PTL 1] United States Patent Application Publication No. 2010/0235832

[PTL 2] Japanese Patent Application Laid-Open Publication No. 2010-122814 (US Patent Application Publication No. 2010/0125715)

SUMMARY OF INVENTION

Technical Problem

In SSP, for example, the cost related to additional introduction of storage systems must be reduced as much as possible, but in an environment where the storage system is used by a mixture of users requesting high performances and those requesting low performances, it is necessary to satisfy the requests of users requesting high performance. Therefore, the SSP must introduce an expensive storage system for realizing high performances. The costs for introducing such expensive storage systems and the costs related to maintenance thereof are high, and the fees charged to users for use of the system are also necessarily increased, so that from the viewpoint of users requiring low performance, the storage resources that he/she is using has excessive performances and requires high fees.

Prior art approaches for solving this problem includes methods for separating network domains among users requesting high performances and users requesting low performances, or methods for independently setting the details of assigned storage resources for each user. According to these methods, however, the management operation becomes difficult and complex. Further, it is common to create a large amount of VMs within a short time these days, and in such environment of use, it requires difficult and complicated operations to set conditions of use of the storage systems independently for each user.

On the other hand, the use of distributed file systems is adopted as a method for enhancing the performance of the storage systems. There are many methods for realizing distributed file systems, but one of the standard methods is called a pNFS (parallel NFS). The pNFS has been studied by many companies and researchers, and was added as a protocol standard of NFS (Network File System) (Registered Trademark) version 4.1 by a standardization organization called IETF (Internet Engineering Task Force). The pNFS is expected to be used widely in the future, together with other distributed file systems.

The performance of the distributed file system can be improved by adopting pNFS. According to pNFS, however, the specification of independent storage systems constituting the data storages of the data storage destination or the types of the storage media disposed in the storage systems are not considered. Therefore, pNFS has a drawback in that the characteristics of the respective storage systems and storage media cannot be fully utilized.

Therefore, in an environment where a distributed file system is adopted in a network system, the present invention aims at improving the performance of the system by providing to a host system storage resources capable of fully utilizing the characteristics of independent storage systems constituting a data storage or the independent storage media disposed in the storage system.

Further, the present invention aims at allocating appropriate storage resources to VMs according to the characteristics of the VMs operating in a virtualization structure of a server in an environment adopting a server virtualization structure in a host system.

Solution to Problem

In order to solve the problems, the network system according to the present invention gathers the storage configuration information of storage resources as the data storage destination and the VM resource information related to the VMs as allocation destination of storage resources. Then, based on the gathered storage configuration information, a storage area per storage tier having different characteristics is formed, and the storage tier of the storage areas to be allocated to the VMs is specified based on the VM resource information.

Advantageous Effects of Invention

According to the present invention, an appropriate storage resource can be allocated to a virtual machine operating in a host system in a distributed file system, so that the overall performance of the system can be improved. The problems, configurations and effects other than those described above will become apparent based on the following description of the preferred embodiments.

BRIEF DESCRIPTION OF DRAWINGS

FIG. 7 is a configuration example of a model rank determination table.

FIG. 8 is a configuration example of a LU rank management table.

FIG. 11 is a view showing a configuration example of an LU Tier rank determination table.

FIG. 12 is a view showing a configuration example of an LU Tier rank management table.

FIG. 14 is a view showing a configuration example of a share rank determination table per resource.

FIG. 15 is a view showing a configuration example of a VM resource share rank management table.

FIG. 17 is a view showing a configuration example of a VM Tier rank determination table.

FIG. 18 is a view showing a configuration example of a VM Tier rank management table.

DESCRIPTION OF EMBODIMENTS

Figure 1:
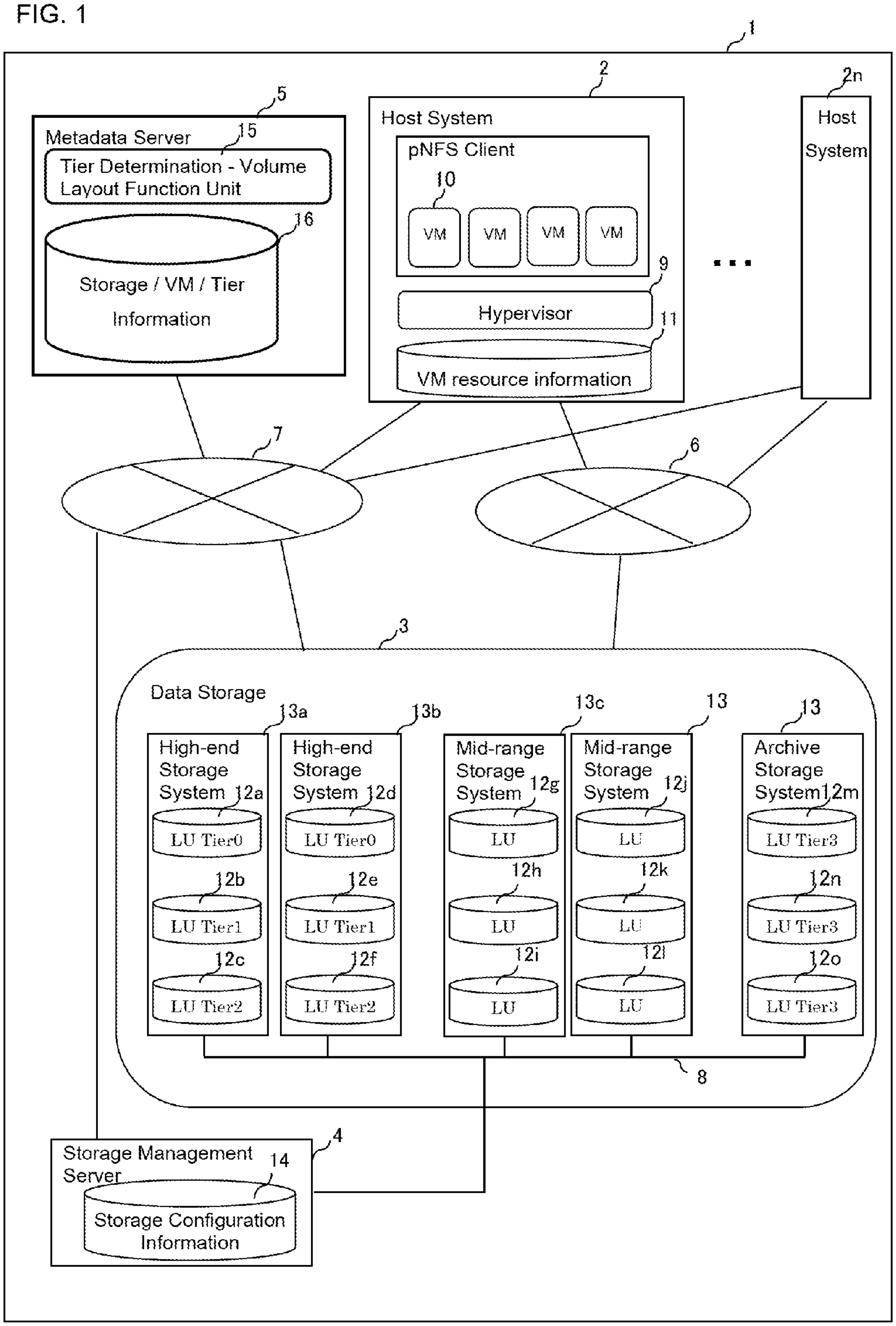
FIG. 1 is a view showing a configuration example of a network system according to a first embodiment of the present invention.

Now, the preferred embodiments of the present invention will be described with reference to the drawings. In the following description, various information are referred to as "management table" and the like, but the various information can be expressed by data structures other than tables. Further, the "table" can also be referred to as "information" to indicate that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or a storage media, for example.

Each element such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of each component can be one or more than one unless defined otherwise.

Embodiment 1

(1) Overall Configuration of Network System

FIG. 1 is a view showing a configuration example of a network system 1 according to a first embodiment of the present invention. The network system 1 enables to allocate storage resources to VMs (Virtual Machines) according to the performances of the VMs that could have not been realized according to a prior art distributed file system.

The network system 1 is comprised of one or more host systems 2, one or more data storages 3, a storage management server 4, and a metadata server 5, which are coupled via networks 6, 7 and 8.

The host system 2 is a computer system equipped with information processing resources such as a CPU and a memory, which can be made up, for example, by a personal computer (hereinafter abbreviated as PC), a mainframe or a server. The host system 2 can be made up by a single computer system or multiple computer systems.

The host system 2 can further have, in addition to the CPU and the memory, an information input device such as a keyboard, a pointing device and a microphone (not shown), and an information output device such as a monitor display and a speaker (not shown).

The host system 2 can adopt a virtualization structure capable of enabling multiple VMs 10 to operate within a physical computer system. Out of the two widely-adopted virtualization methods, which are a "host OS-type virtualization" and a "hypervisor-type virtualization", an example where the "hypervisor-type virtualization" is adopted in the host system 2 is described according to the following description of the present embodiment. In a hypervisor-type virtualization, a hypervisor acts as a virtualization layer within the physical computer system, and multiple VMs 10 can operate at the same time on the virtualization layer.

A hypervisor 9 manages physical resources such as CPUs, memories, storage devices and connection paths (hereinafter referred to as paths) as virtual resource pools. The hypervisor 9 provides resources required by the respective VMs as virtual resources from this virtual resource pool. The hypervisor 9 manages and retains the virtual resource allocation information to the respective VMs 10 as a VM resource information 11.

The networks 6, 7 and 8 can be composed of arbitrary networks such as a SAN (Storage Area Network), a LAN (Local Area Network), the Internet, a public network or a dedicated network. The communication among the host system 2, the data storage 3, the storage management server 4 and the metadata server 5 via the networks 6, 7 and 8 is performed based on a fiber channel protocol if the network 6, 7 or 8 is a SAN, and performed based on a TCP/IP (Transmission Control Protocol/Internet Protocol) if the network is a LAN.

The data storage 3 is comprised of one or more storage systems, and according to the present embodiment, an example is illustrated where a single data storage 3 is composed of five storage systems 13*a*, 13*b*, 13*c*, 13*d* and 13*e* (hereinafter, the storage systems 13*a* through 13*e* are sometimes collectively referred to as storage system 13).

The performances, capacities and purposes of the respective storage systems 13 can be the same or can differ. In a case where a virtual storage resource composed of multiple LUs (Logical Units) of storage tiers is allocated to a VM 10 according to the performance of the VM 10, it is more preferable to compose various storage tiers using one or more storage systems having different performances, capacities and purposes, so that the level of freedom of tier selection is increased and allocation is facilitated.

In the present embodiment, an example is illustrated where three groups are formed from the five storage systems, which are a group of high-end storage systems 13*a* and 13*b* aimed at improving the failure resistance and the I/O performance by multiplexing components and connections without putting weight on cost, a group of mid-range storage systems 13*c* and 13*d* aimed at balancing cost, performance and failure resistance, and a group of archive storage system 13*e* for the purpose of long-term storage of data with the aim to increase the capacity of the system and prevent falsification of data. Other than the above-described storage systems, it is possible to use multiple inexpensive storage systems such as low-end storage systems or entry storage systems to realize distributed storage of data.

The storage system 13 constituting the data storage 3 can use interfaces for a NAS (Network Attached Storage) performing file-based accesses, a SAN (Storage Area Network) storage performing block-based accesses, or an OSD (Object Storage Device) performing object-based accesses, for example, as storage access protocols. In the present embodiment, a SAN storage is adopted as the storage system 13, and the communication between the host system 2 and the storage system 13 realized via a SAN protocol is described. Further, the storage system 13 can have one or more LUs 12*a*, 12*b*, 12*c* through 12*o* (hereinafter also collectively referred to as LU 12) formed within the system, which can be managed in LU units. The connection of the networks can be performed either in a wired manner or wirelessly.

The storage management server 4 is a computer system having information processing sources such as a CPU and a memory, and composed of a PC, a mainframe, a server or the like, similar to the host system 2. The storage management server 4 is connected to the respective storage systems 13 via a network 8, and through communication with the maintenance management terminals (not shown) of the respective storage systems 13, tasks including the maintenance of multiple storage systems 13 and setting up or changing of storage configurations can be managed in a unified manner.

Further, the storage management server 4 retains storage configuration information 14 including the information on the physical resources (such as the number of CPUs, the capacity of the cache memory, the type, capacity and performance of the storage media, and the number of connection paths to the exterior) that each storage system 13 has, the information on the installed software (such as for local copy, synchronous/asynchronous remote copy, virtualization, thin provisioning, and dynamic tier control), maintenance information, the logical configuration information of the LU configuration or logical volumes provided to the host system 2 and formed from multiple LUs, and the management information thereof. The storage management server 4 is connected via a network 7 to the host system 2 and the metadata server 5, and transmits the storage configuration information 14 to the host system 2 and the metadata server 5.

The metadata server 5 is a computer system having information processing resources such as a CPU and a memory, and is composed of a PC, a mainframe, a server or the like, similar to the host system 2 and the storage management server 4. The metadata server 5 is connected to the host system 2, the storage system 13 and the storage management server 4 via a network 7.

The metadata server 5 is a device for controlling a distributed file system for executing reading and writing of data between the host system 2 and the data storage 3 concurrently astride the multiple storage systems 13 constituting the data storage system 3.

The configuration example illustrated in FIG. 1 is an example in which a pNFS standard of NFS version 4.1 set by a standardization organization IETF is adopted as the system for realizing a distributed file system. A system other than the pNFS, such as HDFS (Hadoop Distributed File System) (Registered Trademark), may also be adopted as the system for the present invention.

In addition to the functions provided as the pNFS standard to the metadata server of a standard network system formed according to the pNFS standard described later (FIG. 4), the metadata server 5 is equipped with a Tier determination—volume layout function unit 15 and a storage/VM/Tier information 16 for enabling allocation of virtual storage resources comprised of tiered LUs according to VM characteristics, which is a characteristic feature of the present invention.

The Tier determination—volume layout function unit 15 determines the Tier ranks of the respective LUs using the aforementioned storage configuration information 14, and also determines the Tier ranks of the respective VMs using the virtual resource allocation information required by the respective VMs 10. Then, based on the determined Tier rank of the LU and the Tier rank of the VM, the Tier determination—volume layout function unit 15 determines volume layout, which is shown by the LU type (Tier rank) and the number thereof required for each VM 10.

Further, the storage/VM/Tier information 16 stores the information gathered by the Tier determination—volume layout function unit 15, such as the storage configuration information, the VM resource information, the determined LU Tier rank and VM Tier rank, and the determined volume layout.

The LU Tier categorizes LUs having similar characteristics into a single category as a group, based for example on the requirements that the host system requests in LUs such as the I/O processing speed of storage systems constituting the LUs or the storage media, the failure resistance, the cost, the capacity and so on. Further, the VM Tier categorizes VMs having the same or similar characteristics into a single category as a group, depending on the purpose of the VMs, such as mission-critical purpose, OLTP (On-Line Transaction Processing) purpose, administration purpose, archive purpose and so on, based for example on the virtual CPUs and virtual memory capacities allocated to each VM.

In the present invention, the LUs and VMs having the same or similar characteristics are classified into groups called Tiers corresponding to the respective characteristics, and ranked accordingly. In other words, the VM Tier ranks are determined based on the characteristics of the respective VMs, and then the LU Tier rank corresponding to the determined VM Tier rank is determined. Then, the LU type corresponding to the determined LU Tier rank and the number of LUs based on distribution policy (such as the number of storage systems storing data or files in a distributed manner) are determined, and the volume layout (LU layout: storage destination LU information) is determined.

Based on the above-described system configuration and processing, appropriate storage resources according to the VM characteristics can be allocated to the VMs. We will now describe the configuration in further detail.

<Internal Configuration of Storage System>

Figure 2:
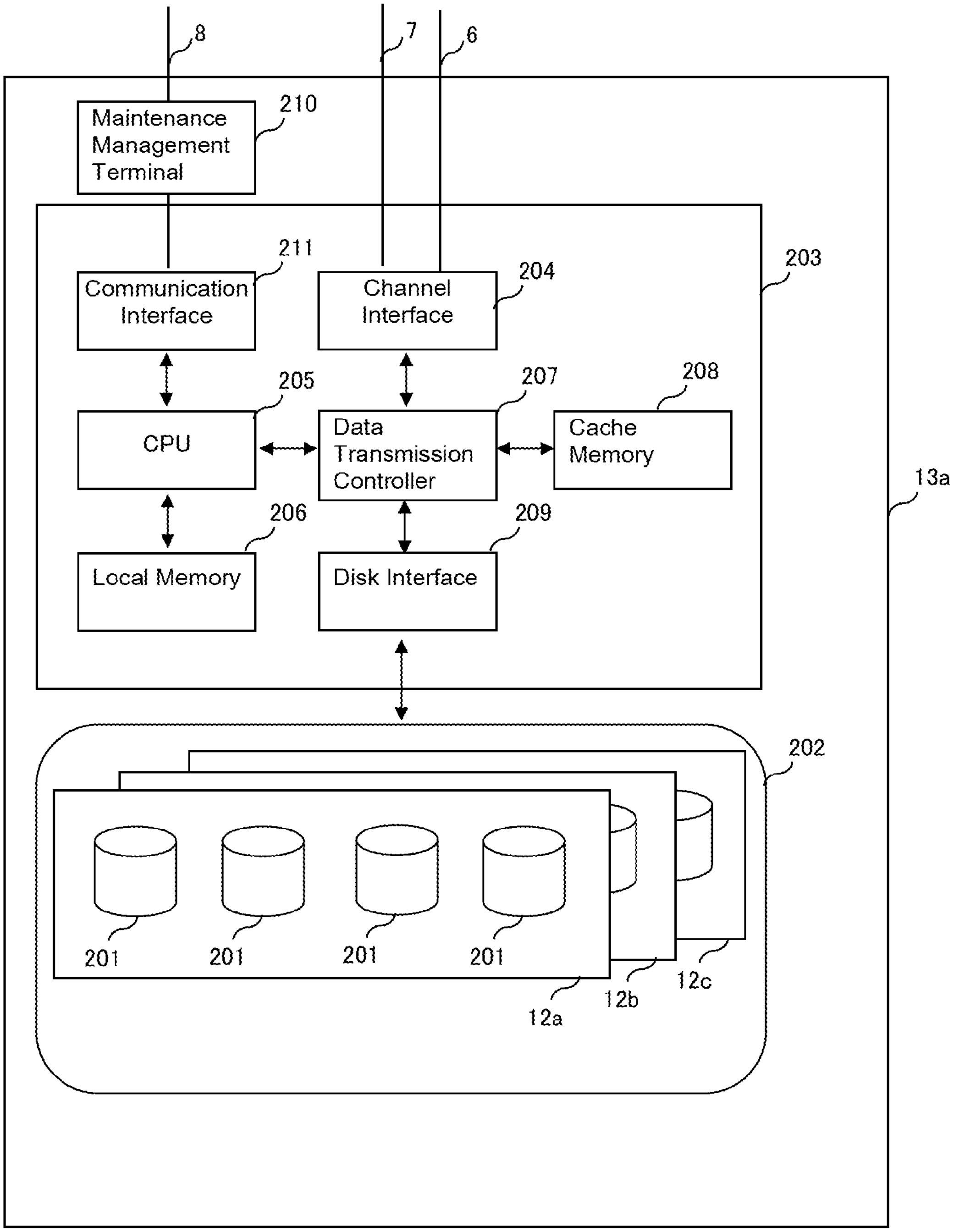
FIG. 2 is a view showing an internal configuration example of the storage system.

FIG. 2 illustrates an internal configuration example of the storage system. FIG. 2 illustrates a configuration example of a high-end storage system 13*a* which is expensive but has a high performance and a high reliability in the SAN storage system adopted as the storage system 13 according to the present embodiment. Unlike the general-purpose PCs and PC servers, the high-end storage system 13*a* is dedicated to storage systems and having superior performance and expandability, which enables to realize a scalable system configuration corresponding to the purpose of use. However, the storage system 13 can also adopt PCs or PC servers.

As shown in FIG. 2, the storage system 13*a* includes a storage media group 202 composed of various storage media 201 such as multiple SSDs (Solid State Drives) and HDDs, and a controller unit 203 for controlling the storage media group 202.

The storage media 201 constituting the storage media group 202 includes HDDs such as the aforementioned SSD, a SAS (Serial Attached SCSI) drive, a near-line SAS drive or a SATA (Serial ATA) drive, or optical disks.

Each storage media 201 is operated via a RAID (Redundant Array of Inexpensive Disks) system via the control unit 203, and realizes a high reliability as an overall storage system 13*a*. A RAID group is composed via multiple storage media, and one or more LUs 12 can be generated for each physical storage area provided by the respective RAID groups. The storage system 13*a* generates three LUs 12*a*, 12*b* and 12*c* within the interior of the system, which is provided to the host system 2.

The data from the host system 2 is stored in block units of given sizes to the LUs 12. In a distributed file system, a single data is divided and stored in a distributed manner to multiple LUs 12 of the storage system 13. Since data is stored in a distributed manner to multiple LUs 12, it is necessary to identify the respective LUs 12, so that the respective LUs 12 are provided with unique identifiers (hereinafter referred to as LU numbers), wherein the allocation of virtual storage resources to the VM 10 are used using this LU number.

The present embodiment is described using an example where LUs 12 are formed on physical storage areas of RAID groups composed of the same type of storage media in the network system 1, and where storage tiers are formed by classifying the types of the storage media constituting the LU 12 into groups. The network system 1 selects two or more LUs 12 composed of the same type of storage media from different storage systems 13, and forms a single volume astride the plurality of LUs 12 (volume layout).

The controller unit 203 includes a channel interface 204, a CPU 205, a local memory 206, a data transfer controller 207, a cache memory 208, a disk interface 209, and a communication interface 211. In the high-end storage system 13*a*, a plurality of the components such as channel interfaces 204 and CPUs 205 of the controller unit 203 are used for redundancy, according to which high reliability and high usability are realized.

The channel interface 204 is a communication controller for connecting the storage system 13*a* to the network 6 or the network 7. Using the channel interface 204, the storage system 13 sends and receives write data from the host system 2, read data to the host system 2, volume layout information related to the layout of the volume, and various commands between the host system 2 or the metadata server 5.

The CPU 205 is a processor for controlling various processes such as the input and output of data to/from the storage media 201 in response to a data input/output request (data write request or data read request) from the host system 2.

The local memory 206 is used as a work memory of the CPU 205, and stores various control programs and system control information read from the cache memory 208, the result of computation via the CPU 205, and so on.

The data transfer controller 207 is a controller for controlling the transfer of data between the CPU 205, the channel interface 204, the disk interface 209 and the cache memory 208.

The cache memory 208 is a memory for temporarily storing the data transferred between the channel interface 204 and the disk interface 209. Further, the cache memory 208 stores the system control information read from the storage media 201 when starting the storage system 13 or the various control programs. The CPU 205 reads and executes these control programs when necessary from the cache memory 208, for example when processing the requests or the like from the host system 2 to the storage system 13.

The disk interface 209 is a communication controller for connecting the storage media 201 and the controller unit 203, and performs, based on a fiber channel protocol, the transmission of write data to the storage media 201, the reception of read data from the storage media 201, and the transmission and reception of various commands, for example.

A maintenance management terminal 210 is a terminal for performing maintenance and management of the storage system 13, and utilizes a notebook PC, for example. The maintenance management terminal 210 is connected to the network 8 and also connected to the controller unit 203 via the communication interface 211, and has a function to monitor whether there is any failure within the storage system 13 and to display or notify the storage administrator a failure information including the location of the failure and the urgency level when failure occurs. Further, the system administrator can use the maintenance management terminal 210 to set up the system configuration to the storage system 13 or to update the configuration being set.

According to the above-described configuration and operation, the storage system 13 forms one or more LUs 12 and provides the same to the host system 2, and sends the storage configuration information 14 set and managed by the storage system 13 to the metadata server 5.

<Internal Configuration of Metadata Server>

Figure 3:
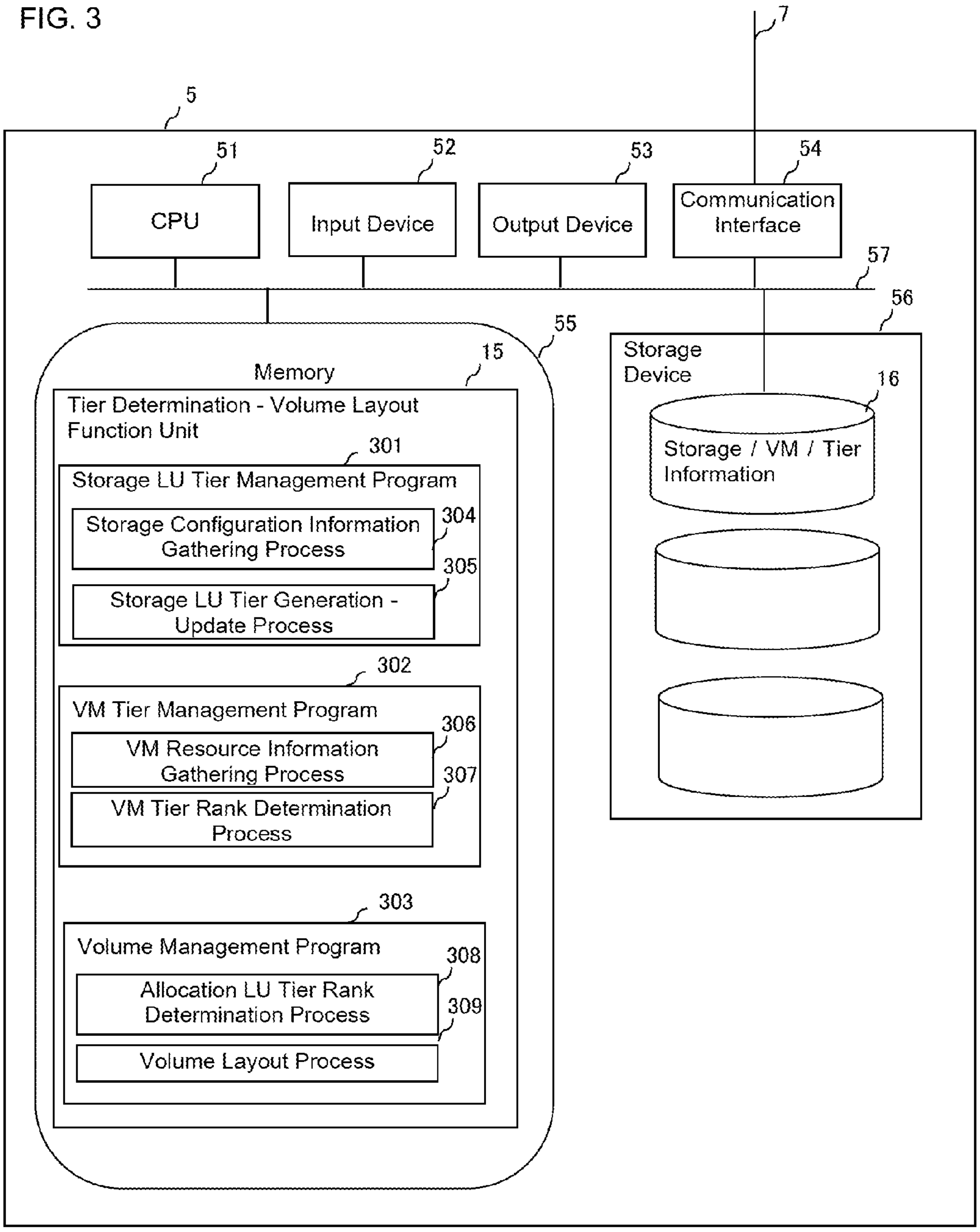
FIG. 3 is a view showing an internal configuration example of a metadata server.

FIG. 3 illustrates a drawing showing the internal configuration example of a metadata server. The metadata server 5 stores metadata indicating the location of storage of files or data and how the files or data are stored. The host system 2 and the storage management server 4 also has a similar configuration as the metadata server 5.

The metadata server 5 includes a CPU 51, an input device 52, an output device 53, a communication interface 54, a memory 55 and a storage device 56, which are mutually connected via an internal bus 57.

The CPU 51 is a processor for controlling the whole metadata server 5. When necessary, the CPU 51 reads the various programs stored in the memory 55 and the storage configuration information stored in the storage device 56, and executes processes such as the determination of Tier rank or the generation of volume layout described in detail later.

The input device 52 is a device for entering the information from the exterior to the metadata server 5, such as a keyboard, a mouse, a pointing device or a microphone.

The output device 53 is a device for outputting information to the exterior of the metadata server 5, such as a display, a speaker or a printer.

The communication interface 54 is a communication controller for connecting the host system 2, the data storage 3, the storage management server 4 and the metadata server 5 via the network 7. The communication interface 54 can be, for example, a NIC (Network Interface Card).

The memory 55 is composed of a volatile memory such as a RAM (Random Access Memory) or a nonvolatile memory such as a flash memory, for temporarily storing the various programs such as the OS or application and the result of computation via the CPU 51. The memory 55 stores the Tier determination—volume layout function unit 15, which is a group of control programs for realizing the present invention.

The storage device 56 is a nonvolatile device for storing various programs and information, and uses multiple HDDs, for example. The storage/VM/Tier information 16, which is a characteristic feature of the present invention, is stored in the storage device 56.

The metadata server 5 comprises, in addition to a function of a pNFS standard provided to a metadata server of an ordinary network system formed based on the pNFS standard described later (FIG. 4), a Tier determination—volume layout function unit 15 and a storage/VM/Tier information 16 capable of allocating, based on the VM characteristics, the virtual storage resources formed of tiered LUs, which are characteristic features of the present invention.

The Tier determination—volume layout function unit 15 includes a storage LU Tier management program 301 for managing the Tiers of the LU, a VM Tier management program 302 for managing the Tiers of VMs, and a volume management program 303 for managing the volume layout.

The storage LU Tier management program 301 includes a storage configuration information gathering process 304 for collecting the storage configuration information 14 of the storage system 13, and a storage LU Tier generation—update process 305 for determining the Tier rank of the LUs 12 retained by the respective storage systems 13 based on the collected storage configuration information 14.

The VM Tier management program 302 includes a VM resource information gathering process 306 for gathering the VM resource information related to virtual resources allocated to the VM 10, and a VM Tier rank determination process 307 for determining the Tier rank of each VM 10 based on the gathered VM resource information.

The volume management program 303 includes an allocation LU Tier rank determination process 308 for determining the Tier rank of the LU 12 to be allocated to each VM 10 based on the determined LU Tier rank and the VM Tier rank, and a volume layout process 309 for determining the volume layout of the virtual storage resources provided to the VM 10 based on the determined Tier rank of the LU 12 to be allocated to the VM 10 and the distribution policy.

The distribution policy determines the number of storage systems 13 to which a single file or a data block is divided and distributed. For example, if the file or the data block is distributed and stored in three storage systems 13 based on the distribution policy, three LUs 12 of the same Tier rank are selected respectively from three storage systems, and the file or the data block is divided and simultaneously stored in the respective LUs 12. In other words, if the distribution policy is "3", the volume management program 303 selects three LUs 12 of the same Tier rank.

Further, volume layout refers to forming a volume based on the distribution policy in multiple selected LUs 12 (storage destination LUs), and associating the VM numbers for identifying the VMs 10 with the LU number group of the storage destination.

The storage/VM/Tier information 16 is information such as the storage configuration information 14 gathered by the Tier determination—volume layout function unit 15, the VM resource information 11, the Tier rank of the LU 12 and the Tier rank of the VM 10 determined by the respective programs, the allocation LU Tier rank being determined, and the volume layout.

As described, by the metadata server 5 having the Tier determination—volume layout function unit 15 and the storage/VM/Tier information 16, the virtual storage resource corresponding to the VM characteristics can be allocated appropriately to the respective VMs 10.

(2) Normal Distributed File System (Prior Art)

Figure 4:
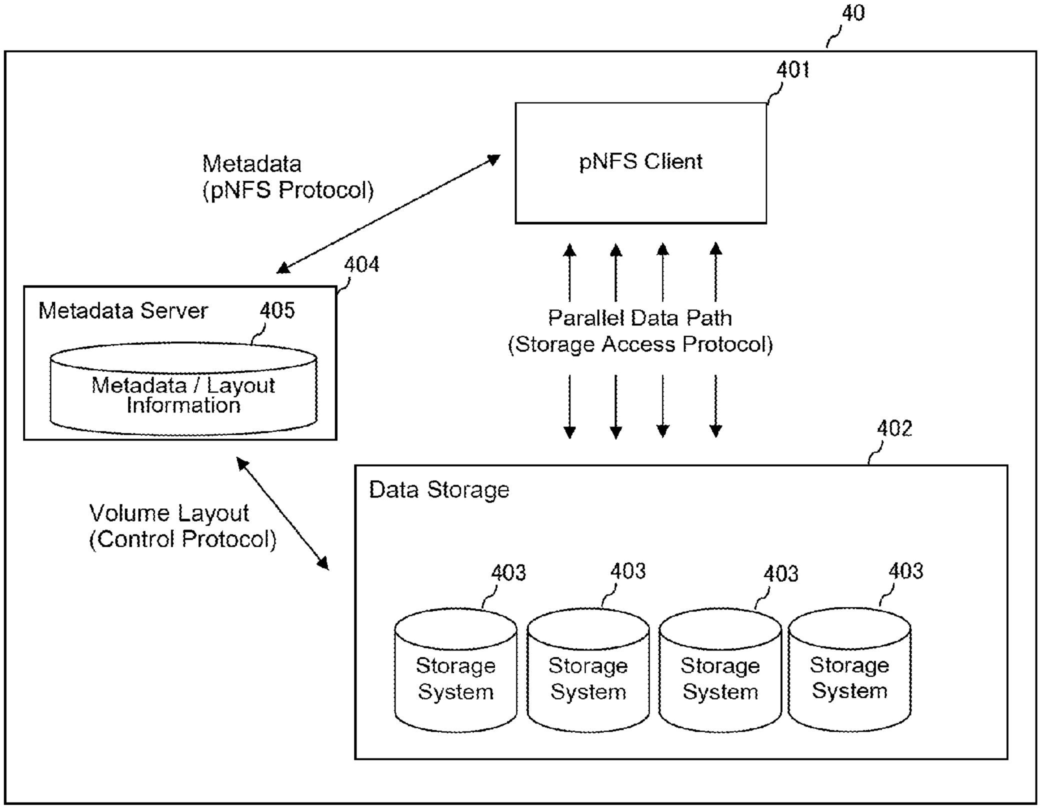
FIG. 4 is a schematic view of a network system in conformity with the prior art pNFS standard.

FIG. 4 is a schematic view of a prior art network system in conformity with pNFS standard. The configuration and operation of a normal distributed file system 40 according to the prior art will be described with reference to FIG. 4.

The distributed file system 40 is composed of a pNFS client 401, a data storage 402 composed of a plurality of storage systems 403, and a metadata server 404. The pNFS client 401, the data storage 402 and the metadata server 404 respectively correspond to the host system 2, the data storage 3 and the metadata server 5 of FIG. 1.

In the distributed file system 40, the transmission and reception of metadata being the storage destination information of data is executed between the pNFS client 401 and the metadata server 404 based on pNFS protocol. Further, in the distributed file system 40, the transmission and reception of actual data is executed based on a given storage access protocol between the pNFS client 401 and the data storage 402 without intervening the metadata server 404.

The metadata server 404 manages the volume layout showing how the actual data is distributed and stored in the plurality of storage systems 403 constituting the data storage 402. This volume layout is transmitted and received according to a given control protocol between the metadata server 404 and the data storage 402.

Further, the metadata server 404 provides metadata showing the data storage destination to the pNFS client 401 so as to enable the pNFS client 401 to directly access the data storage 402. The metadata server 404 stores the metadata/layout information composed of the metadata and the volume layout configuration information.

The pNFS client 401 is connected via parallel data paths to the storage system 403 constituting the data storage 402. The pNFS client 401 can access multiple storage systems 403 simultaneously in parallel via the parallel data paths based on the metadata acquired from the metadata server 404. Further, the state of the metadata server 404 and the state of the data storage 402 are synchronized between the metadata server 404 and the data storage 402.

Based on such system configuration and access operation, in the distributed file system constituted according to pNFS standard, the communication of metadata is separated from the communication of actual data, and the pNFS client accesses multiple storage systems simultaneously in parallel, so as to enable high-speed writing of data to the data storage and high-speed reading of data from the data storage.

(3) Allocation of Virtual Storage Resource to VM

Figure 5:
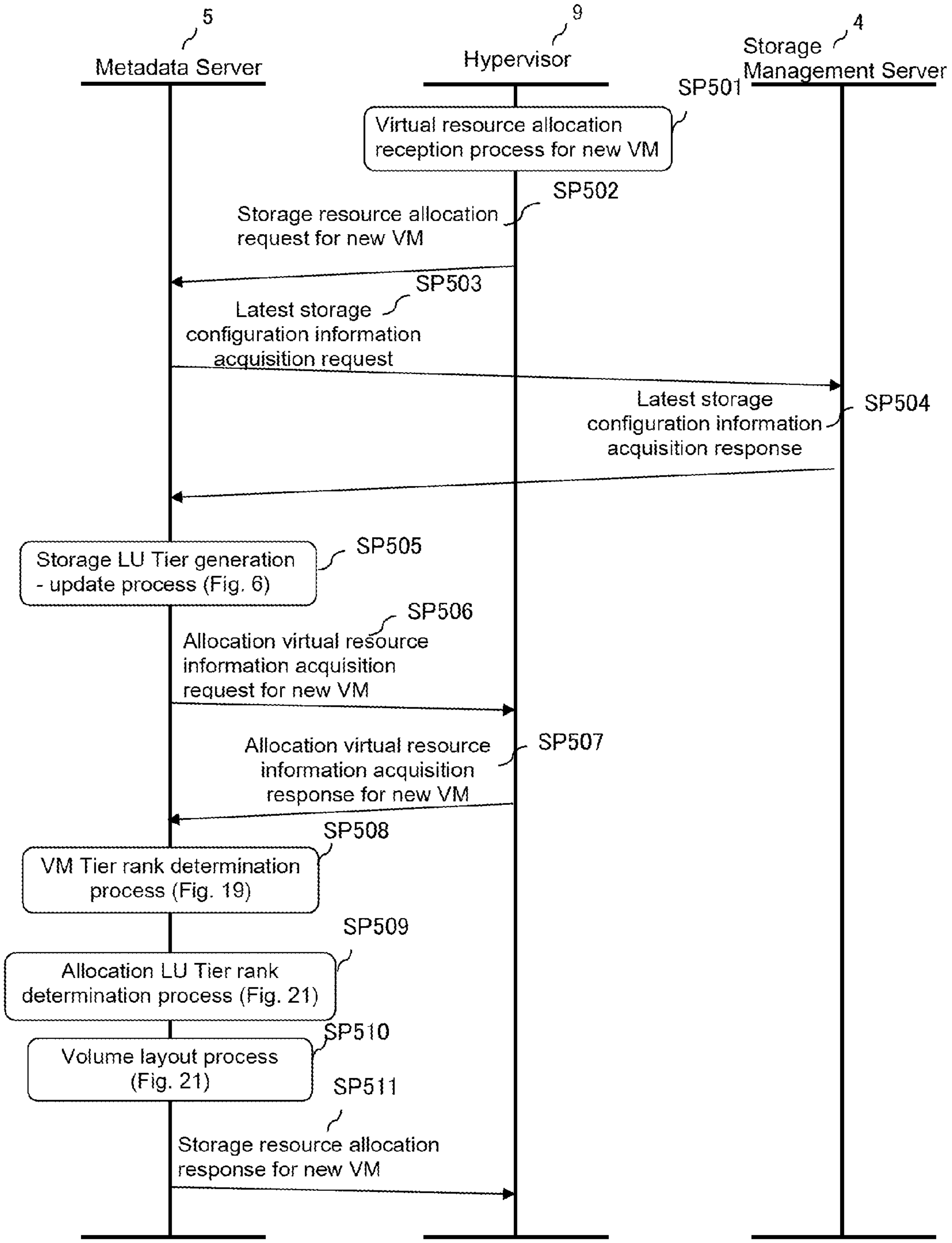
FIG. 5 is a sequence chart showing the process for allocating storage resources to VMs.

FIG. 5 is a sequence view showing the process of allocating a storage resource to a VM. FIG. 5 is, within the network system 1, showing the overall process from the generation of an allocation request of a virtual storage resource to a newly created VM 10 to the completion of allocation of the virtual storage resource to the VM 10. Based on this sequence view, the requests output from the respective devices constituting the network system 1, the response thereto, and the processes performed in the respective devices are described in detail. Further, the subject of the processes herein is described as the device itself or the program such as the hypervisor operating in the device, but the subject can also be a CPU or various controllers for operating the device or the program.

At first, when the hypervisor 9 of the host system 2 receives a new VM creation request (or a configuration change request of an existing VM) from the user, the hypervisor 9 allocates a virtual CPU or/and a virtual memory as a virtual host resource of the host system 2 (hereinafter abbreviated as virtual resource) to the new VM based on the content of the creation request (or update request). The scale of the amount subjected to allocation in a virtual CPU can be the number CPUs, the operation frequency, or the processing performance such as the IOPS (I/O per second). In a virtual memory, the scale can be the memory capacity or the access performance. The virtual resource information allocated to the new VM 10 is managed as the VM resource information by the hypervisor 9.

Next, the hypervisor 9 executes the allocation processing of a virtual storage resource to a new VM 10. The above-described process is a virtual resource allocation reception processing of a new VM shown in FIG. 5 (SP501).

The hypervisor 9 executes a storage resource allocation request for a new VM including the storage capacity information required in a new VM 10 to the metadata server 5 (SP502).

When the metadata server 5 receives a storage resource allocation request for a new VM from the hypervisor 9, a request to acquire the latest storage configuration information is output to the storage management server 4 (SP503).

When the latest storage configuration information acquisition request is received, the storage management server 4 transmits the storage configuration information 14 stored within device as a latest storage configuration information to the metadata server 5 (SP504). It is also possible for the storage management server 4 to re-gather the storage configuration information of the respective storage systems 13 instead of the storage configuration information 14 stored in itself, and to create the latest storage configuration information 14 before transmitting the same to the metadata server 5.

Next, the metadata server 5 executes a storage LU Tier generation—update process based on the acquired latest storage configuration information 14, and determines the Tier rank of the LU 12 created in each storage system 13 (SP505).

The processing of SP503 and SP504 correspond to the storage configuration information gathering process 304 of the storage LU Tier management program 301 shown in FIG. 3, and the processing of SP505 corresponds to the storage LU Tier generation—update process 305. The detailed operation of processing will be described with reference to FIGS. 6 through 12.

When the storage LU Tier generation—update process (SP505) is completed, the metadata server 5 transmits to the hypervisor 9 a request to provide a virtual host resource information to be allocated to the new VM, that is, an allocation virtual resource information acquisition request for the new VM (SP506).

When the hypervisor 9 receives the allocation virtual resource information acquisition request for the new VM from the metadata server 5, the hypervisor transmits the stored VM resource information 11 to the metadata server 5 (SP507).

The metadata server 5 executes a VM Tier rank determination process based on the acquired VM resource information 11, and determines the Tier rank of each VM 10 (SP508).

The processes of SP506 and SP507 correspond to the VM resource information gathering process 306 of the VM Tier management program 302 shown in FIG. 3, and the process of SP508 corresponds to the VM Tier rank determination process 307 thereof. The detailed operation of the processes will be described with reference to FIGS. 16 through 18.

After the aforementioned VM Tier rank determination process is terminated, the metadata server 5 determines the Tier rank of the LU to be allocated to each VM 10 (SP509).

The metadata server 5 selects a number of LUs 12 requested by the distribution policy corresponding to the LU Tier rank determined in SP509, and performs layout of the volumes of the virtual storage resources to be allocated to the VM 10 (SP510). This volume layout information is composed of a VM number for identifying the VM 10, the LU number being the data storage destination, a storage capacity and so on.

Lastly, the metadata server 5 transmits to the hypervisor 9 a storage resource allocation response for a new VM including the volume layout information, and provides the volume of the virtual storage resource subjected to layout to the VM 10 (SP511).

The process of SP509 corresponds to the allocation LU Tier rank determination process 308 of the volume management program 303 illustrated in FIG. 3, and the processes of SP510 and SP511 correspond to the volume layout process 309 thereof. The detailed operation of processing will be described with reference to FIGS. 20 and 21.

The present embodiment describes an example in which the hypervisor 9 outputs a storage allocation request for a new VM to the metadata server 5 by designating the storage capacity and not designating the Tier rank of the LU 12. However, it is also possible to output a storage resource allocation request for a new VM to the metadata server 5 by designating the necessary Tier rank of the LU 12 together with the storage capacity. In that case, the metadata server 5 can omit the VM Tier rank determination process based on the acquired VM resource information 11, and select the number of LUs 12 based on the distribution policy corresponding to the LU Tier rank designated in the storage allocation request for a new VM, so as to layout the logical volume to be allocated to the new VM 10.

Based on the above processing, in the network system according to the present embodiment, it becomes possible to allocate a virtual storage resource (LU of the storage tier) satisfying the VM characteristics to a VM appropriately.

Next, the detailed operation of the storage resource allocation processing to the VM 10 will be described with reference to FIGS. 6 through 20.

(3-1) Storage LU Tier Generation—Update Process

Figure 6:
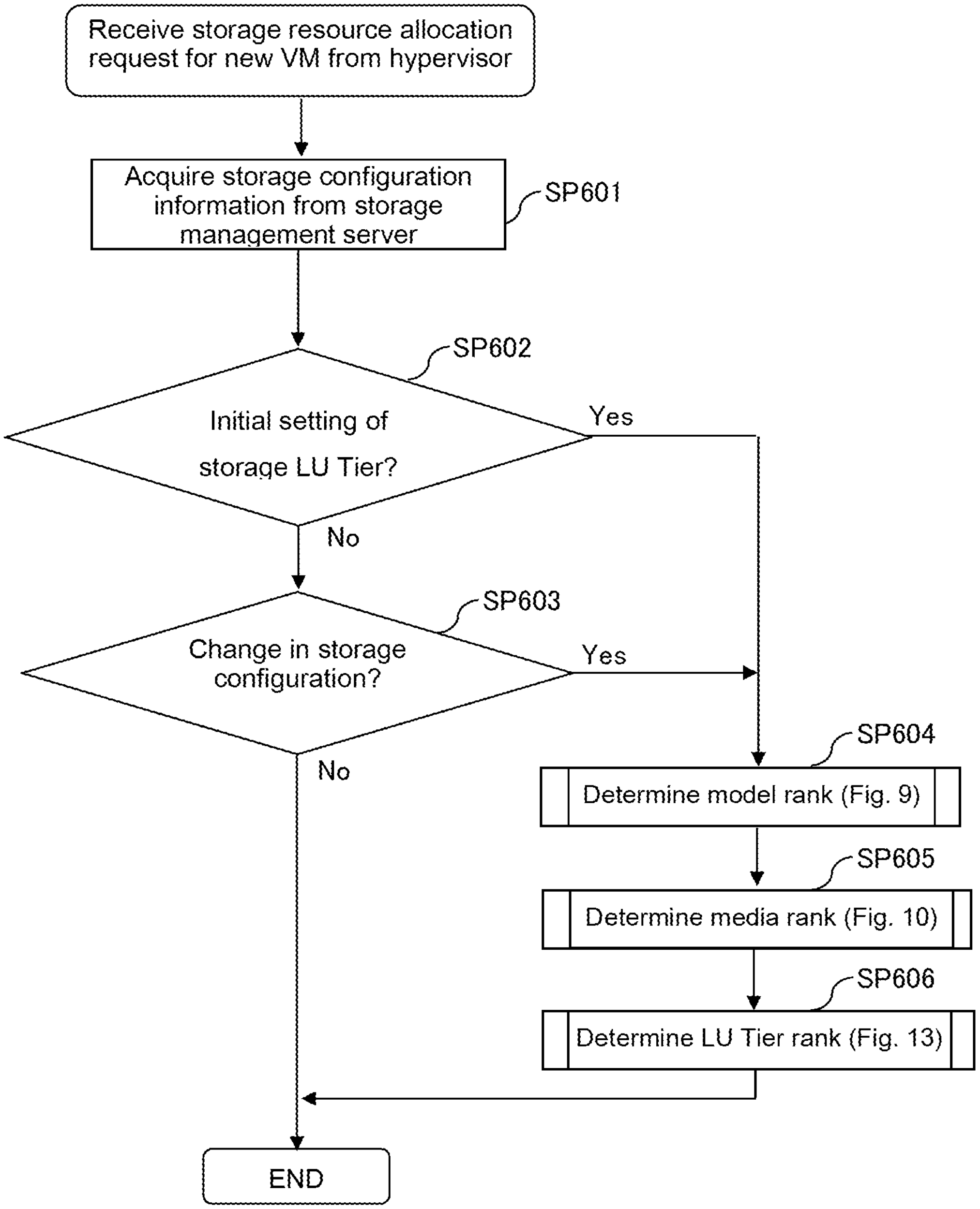
FIG. 6 is a flowchart showing a generation—update process of a storage LU Tier rank.

FIG. 6 is a flowchart showing the generation—update process of the storage LU Tier rank. The present flowchart shows the process starting from when the metadata server 5 receives a storage resource allocation request for a new VM from the hypervisor 9 to when the storage LU Tier generation—update process is completed, and corresponds to the process from SP502 to SP505 of FIG. 5.

By the storage LU Tier management program 301 executing the process shown in the present flowchart, it becomes possible to determine and update the Tier rank of each LU formed in the storage system 13. This process is started when the metadata server 5 receives a storage resource allocation request for a new VM from the hypervisor 9.

At first, the storage LU Tier management program 301 transmits the latest storage configuration information acquisition request to the storage management server 4. Then, when the storage management server 4 receives the latest storage configuration information acquisition request, it transmits the storage configuration information 14 stored within the server as the latest storage configuration information to the metadata server 5, and the information is received by the storage LU Tier management program 301 of the metadata server 5 (SP601).

Next, the storage LU Tier management program 301 determines based on the acquired latest storage configuration information 14 whether the determination of the storage LU Tier rank in the storage system 13 itself or in the LU of the storage system 13 (hereinafter referred to as LU Tier rank) is performed for the first time or not (SP602).

If it is the first time to perform the determination of the LU Tier rank (SP602: Yes), the storage LU Tier management program 301 determines the model of each storage system 13 constituting the data storage 3 based on the acquired latest storage configuration information 14 (SP604).

The storage LU Tier management program 301 determines the type of storage media 201 constituting each storage LU (hereinafter referred to as LU) 12 (SP605).

The storage LU Tier management program 301 determines the Tier rank of each LU 12, and ends the process (SP606).

If it is not the first time to perform the determination of the storage LU Tier (SP602: No), the storage LU Tier management program 301 compares the acquired latest storage configuration information to the previously acquired storage configuration information, and determines whether there is any change in the storage configuration (SP603).

If there is any change in storage configuration (SP603: Yes), the storage LU Tier management program 301 executes the processes from SP604 to SP606 to update the Tier rank of each LU 12, and ends the process.

If there is no change in storage configuration (SP603: No), the storage LU Tier management program 301 ends the process. Then, in the allocation LU Tier rank determination process, the previously determined Tier rank of each LU 12 in each storage system is used. Based on the above process, it becomes possible to set up the Tier rank of each LU 12 of the storage system.

<Model Rank Determination Table>

FIG. 7 is a view showing a configuration example of a model rank determination table. The model rank table 700 is a table for determining a model rank 701, which is the rank within each storage system 13, based on a model name 702. This table focuses on the fact that storage systems 13 of the same class are generally denoted with a name of the same series, and in the present embodiment, the characteristic area indicating the name of a same series is extracted from the storage configuration information 14 and the extracted information is stored and managed as the model name 702 in the model rank table 700.

For example, the rank of the model having a name beginning with "SSS" as in row 711 (such as SSS123) is determined as "High-end", and the rank of the model having a name beginning with "BBB" as in row 712 is determined as "Mid-range". The area of "*" as in "SSS*" can be any name.

Figure 9:
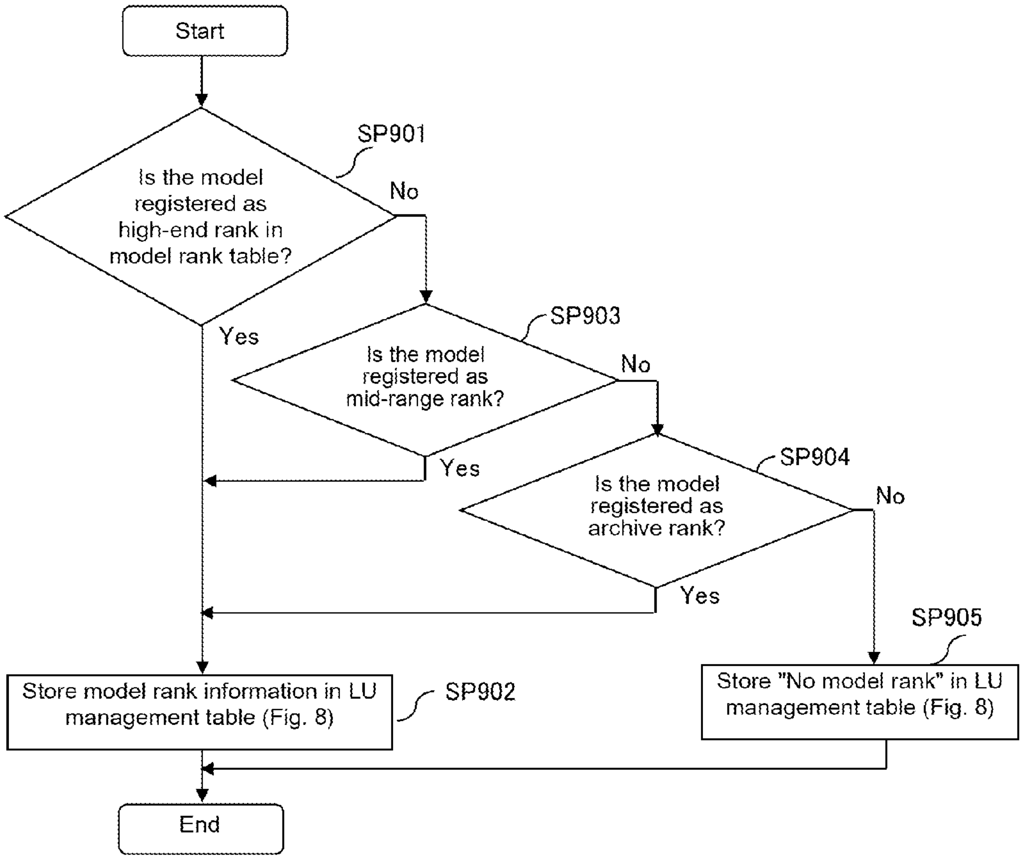
FIG. 9 is a flowchart showing a process for determining a model rank in a storage system.

In a model rank determination process of FIG. 9, the model rank is determined based on whether the storage system name hits a model name 702, wherein if there is a hit, the storage system 13 is ranked based on the corresponding model rank 701. The model rank can be classified not necessarily depending on the information indicating the name of a same series, but based on other information capable of specifying each storage system 13 that can be acquired by the storage management server 4.

<LU Rank Management Table>

FIG. 8 is a view showing a configuration example of a LU rank management table. The LU rank management table 800 is a table for managing a model rank 802 and a media rank 803 of each LU (LU number 801). It stores and manages the model rank and the media rank with respect to the LU 12 subjected to a model rank determination process (FIG. 9) and a media rank determination process (FIG. 10) described later. The LU rank management table 800 is referred to via a process for determining the LU Tier rank described with reference to FIG. 14 and subsequent drawings.

<Model Rank Determination Process>

FIG. 9 is a flowchart showing the process for determining the model rank of the storage system 13 constituting the data storage 3. The storage LU Tier management program 301 determines the model rank of each storage system 13 using the model rank determination table 700, and stores the result in the LU rank management table 800. This process corresponds to the model rank determination process in SP604 of FIG. 6.

In the present embodiment, storage systems used for mission-critical systems or OLTP (On-Line Transaction Processing) are classified as a high-end rank group, enabling high speed I/O processing and having high reliability (with high MTBF (Mean Time Between Failures) and small MTTR (Mean Time To Repair).

Storage systems used as file servers or web servers for sharing internal information within a company and realizing balance between cost and performance are classified as a mid-range rank group. Storage systems designed to perform backup of a large amount of data or for long-term storage of data are classified as an archive rank group. The storage system 13 is subjected to ranking using the model rank determination table 700 showing which models belong to which group. The actual operations of the process will be described hereafter.

At first, the storage LU Tier management program 301 extracts the model name of each storage system 13 and the LU number which is the information on the LU 12 formed within the system based on the acquired latest storage configuration information 14. The storage LU Tier management program 301 verifies the extracted model name with the model name 702 in the model rank determination table 700, and determines whether the model of the storage system is "High-end" in which the model rank is classified into a high-end rank (SP901).

If the storage system is classified in a high-end rank (5P901: Yes), the storage LU Tier management program 301 stores the LU number and the rank classified as high-end rank to the LU rank management table 800 of FIG. 8, and ends the process (SP902). For example, if the storage system 13*a* includes LUs from number 00 to number 02, "High-end" is entered in the entry of model rank 802 corresponding to LU numbers 801 "LU00" to "LU02".

If the storage system 13 is not a storage system classified to the high-end rank (SP901: No), the storage LU Tier management program 301 determines whether the storage system is classified to a mid-range rank (SP903). If the storage system is classified to the mid-range rank (SP903: Yes), the storage LU Tier management program 301 enters the LU number and the mid-range rank classification in the LU rank management table 800, and ends the process (SP902).

If the storage system 13 is not a storage system classified into the mid-range rank (SP903: No), the storage LU Tier management program 301 determines whether the storage system is classified into an archive rank (SP904). If the storage system is classified into the archive rank (SP904: Yes), the storage LU Tier management program 301 stores the LU number and the archive rank classification in the LU rank management table 800, and ends the process (SP902).

If the storage system 13 is not a storage system classified into the archive rank (SP904: No), the storage LU Tier management program 301 stores the LU number and that the model is not ranked, that is, "No model information" in the LU rank management table 800 as shown in row 814, and ends the process (SP905).

In the present embodiment, the model ranks are classified into four groups, that are high-end, mid-range, archive and no model information, but the number of classifications of ranks can be greater or smaller than four. Further, the rank criteria do not have to be classified into high-end, mid-range and archive indicating the performance or purpose of the system.

Based on the model rank determination process from SP901 through SP905, it becomes possible to acquire the LU information formed in the storage system 13 and to determine the model rank, and the information corresponding to entries of the LU number 801 and the model rank 802 of the LU rank management table 800 can be stored.

<Media Rank Determination Process>

Figure 10:
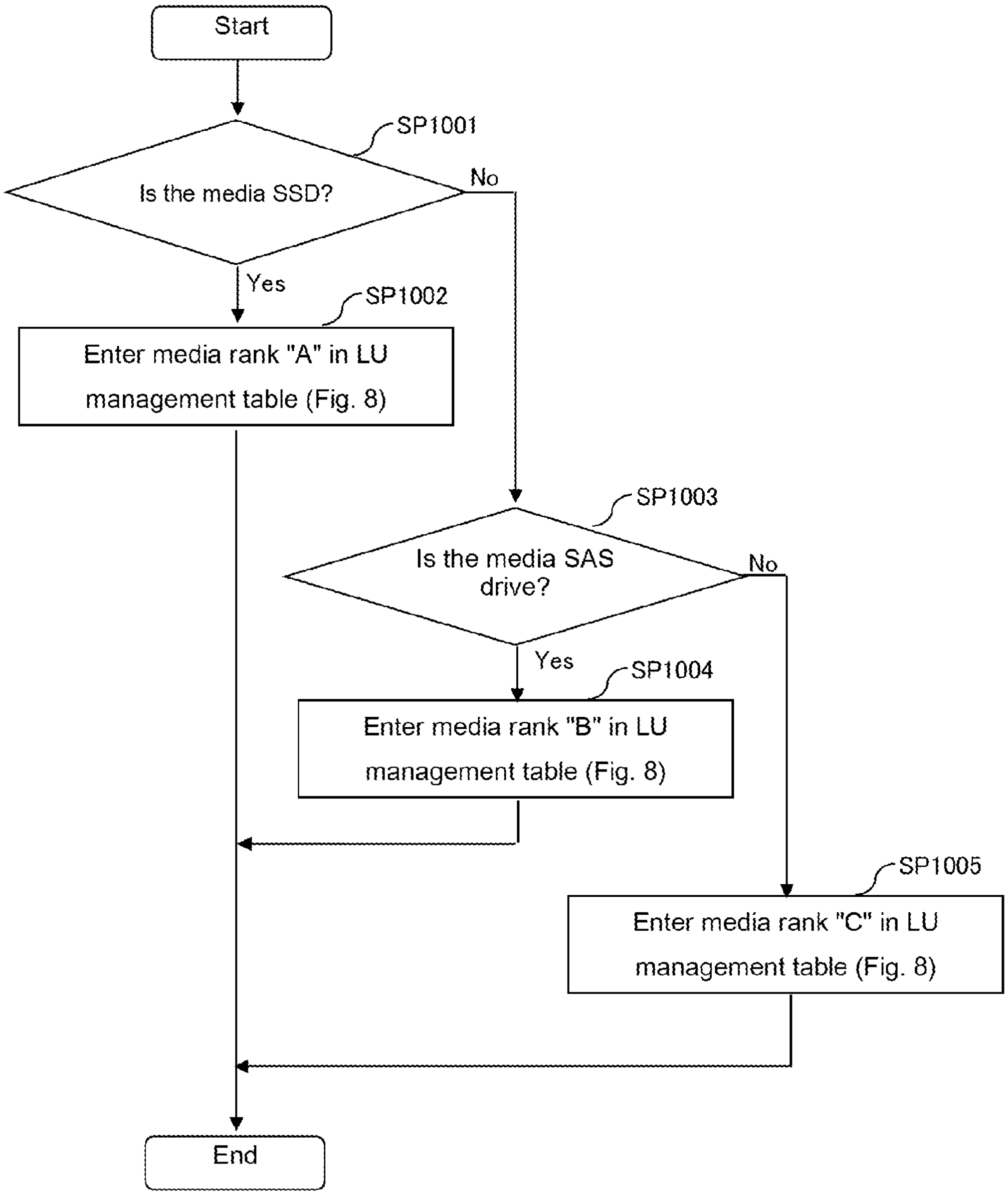
FIG. 10 is a flowchart showing a determination process of a media rank of a storage media constituting an LU.

FIG. 10 is a flowchart illustrating the process for determining a media rank of the storage media constituting the LU. The storage LU Tier management program 301 determines the types of the storage media 201 constituting the LU 12 and classifies the same into ranks, and the result of the ranking is stored in the entry of the media rank 803 of the LU rank management table 800. This process is the media rank determination process shown in SP605 of FIG. 6.

In the present embodiment, the storage media are classified into three classifications, which are a media rank "A" in which SSDs are classified as the storage media 201 having superior performances regarding throughput and I/O response time, a media rank "B" in which SAS drives are classified as the storage media having a performance second to the SSD, and media rank "C" in which other storage media are classified.

The storage LU Tier management program 301 determines based on the acquired latest storage configuration information 14 whether the storage media 201 constituting each LU 12 is an SSD or not (SP1001).

If the storage media 201 constituting the LU 12 is an SSD (SP1001: Yes), the storage LU Tier management program 301 stores "A" in the entry of the media rank 803 of the LU rank management table 800 as shown in row 811, and ends the process (SP1002).

If the storage media constituting the LU is not an SSD (SP1001: No), the storage LU Tier management program 301 determines whether the storage media is an SAS drive (SP1003).

If the storage media constituting the LU is an SAS drive (SP1003: Yes), the storage LU Tier management program 301 stores "B" in the entry of the media rank 803 to the LU rank management table 800 as shown in row 812, and ends the process (SP1004).

If the storage media constituting the LU is not an SAS drive (SP1003: No), the storage LU Tier management program 301 stores "C" in the entry of the media rank 803 of the LU rank management table 800 as shown in row 813, and ends the process (SP1005).

In the present embodiment, the media ranks are classified into three classifications, A, B and C, but the number of ranks can be greater or smaller than three. Further according to the present embodiment, the types of the media subjected to determination are classified into three ranks, an SSD, a SAS, and other than the SSD and SAS, but it is also possible to classify the media in further detail using a Near-Line SAS drive, a SATA drive, an optical drive, an FC (Fiber Channel) drive or a flash module. Further, the present embodiment is described assuming that each LU 12 is formed of the same type of storage media, but if there are LUs 12 formed of different types of storage media, it is also possible to add a rank "D" for classifying LUs formed from different types of storage media.

According to the present invention, the storage media constituting the LU can be ranked by executing a storage media determination process from SP1001 to SP1005, according to which the result of ranking can be stored in the entry of the media rank 803 of the LU rank management table 800, by which the LU number, the model rank and the media rank corresponding thereto can be managed.

<<Determination of LU Tier Rank>>

<LU Tier Rank Determination Table>

FIG. 11 is a view showing a configuration example of a LU Tier rank determination table. The LU Tier rank determination table 1100 determines the LU Tier rank from the model rank 1201 and the media rank 1202 of the LU 12 within the storage system 13, which is composed of a model rank 1101, a media rank 1102 and an LU Tier rank 1110.

In the present embodiment, Tier 0 is set to a highest rank and Tier 3 is set to a lowest rank, wherein LUs capable of performing high speed I/O processing are classified into LU Tiers of higher ranks, and LUs performing low speed 110 processing but are inexpensive and having a large storage capacity are classified into LU Tiers of lower ranks. For example, the storage LU Tier management program 301 determines that the LU Tier rank 1110 having a model rank 1101 set to "High-end" and a media rank 1102 set to "A" is "Tier 0", and the LU Tier rank 1110 of "Mid-range" and "B" is "Tier 1.5".

The LU Tier rank determination table 1100 of the present embodiment shows a table for determining the LU Tier rank corresponding to a model rank 1101 classified into four classifications and a media rank 1102 classified into three classifications in the LU rank management table 800. The LU Tier rank determination table 1100 can also have the model rank classified into three classifications or less or five classifications or more, and also have the media rank classified into two classifications or more than four classifications.

Further according to the present embodiment, the Tier rank is classified into seven classifications, which are "Tier 0", "Tier 0.5", "Tier 1", "Tier 1.5", "Tier 2", "Tier 2.5" and "Tier 3", but the number of classifications can be greater or smaller than seven. The LU Tier rank determined based on the model ranks and the media ranks is merely an example, and it is also possible to determine the LU Tier rank via a different method that differs from the method according to the present embodiment, for example by defining three levels of model performance ranks, which are "high", "mid" and "low", instead of the model rank, and by defining four levels of media performance ranks, which are "high speed", "fast", "normal" and "slow", instead of the media rank.

<LU Tier Rank Management Table>

FIG. 12 is a view showing a configuration example of a LU Tier rank management table. The LU Tier rank management table 1200 is a table for storing and managing an LU number 1201 and various ranks thereof entered to each entry of a model rank 1202, a media rank 1203 and an LU Tier rank 1204. The LU number 1201, the model rank 1202 and the media rank 1203 store the information of the LU rank management table 800. The LU Tier rank 1204 stores the information of the LU Tier rank determined in the LU Tier rank determination table based on the model rank and the media rank. The LU Tier rank management table 1200 is referred to by an allocation LU Tier rank determination process of the volume management program 303 described later, based on which the LU Tier rank of the storage resource allocated to VM 10 is determined.

As shown in row 1211, the LU having an LU number 1201 of "LU00" stores "High-end" in the entry of the model rank 1202, "A" in the entry of the media rank 1203, and "Tier 0" in the entry of the LU Tier rank 1204. Similarly, "Mid-range", "B" and "Tier 1.5" are stored and managed for "LU10" of row 1212. Rows 1213 and 1214 are entered in a similar manner.

<Determination Process of LU Tier Rank>

Figure 13:
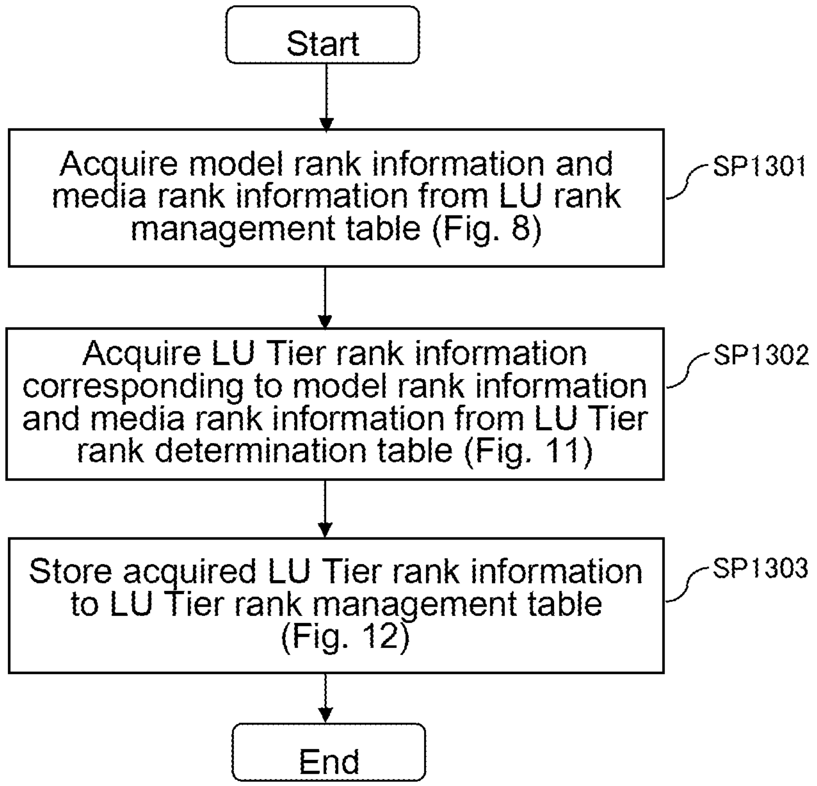
FIG. 13 is a flowchart showing an LU Tier rank determination process.

FIG. 13 is a flowchart showing the LU Tier rank determination process. The storage LU Tier management program 301 determines the rank of the LU Tier, and stores the ranked result in the LU Tier rank management table 1200. This process corresponds to the LU Tier rank determination process of SP606 shown in FIG. 6.

At first, the storage LU Tier management program 301 acquires the model rank information and the media rank information of the LU 12 subjected to Tier rank determination from the LU rank management table 800 (SP1301). For example, as shown in row 813, the storage LU Tier management program 301 acquires a model rank information of "Archive" from the model rank 802 and a media rank information of "C" from the media rank 803 in order to determine the Tier rank of the LU having "LU20" as the LU number 801.

Thereafter, the storage LU Tier management program 301 acquires from the LU Tier rank determination table 1100 the LU Tier rank information that matches both the acquired model rank information and the media rank information (SP1302).

Since the LU Tier rank 1110 in which the model rank information is "Archive" and the media rank information is "C" is "Tier 3", the storage LU Tier management program 301 acquires "Tier 3" as the Tier rank information.

After acquiring the LU Tier rank information, the storage LU Tier management program 301 stores the acquired LU number, the model rank information, the media rank information and the LU Tier rank information as determination result to the LU Tier rank management table 1200, and ends the process (SP1303).

By executing the processes from SP1301 to SP1303, it becomes possible to determine the LU Tier rank corresponding to LU 12.

(3-2) Determination of VM Tier Rank

<<VM Resource Share Ranke Determination>>

<Share Rank Determination Table Per Resource>

FIG. 14 is a view showing a configuration example of a share rank determination table per resource. The share rank determination table per resource is composed of two types of tables, a virtual CPU share rank determination table 1400 in which a virtual CPU allocation share 1401 and a virtual CPU share rank 1402 corresponding thereto are defined, and a virtual memory share rank determination table 1410 in which a virtual memory allocation share 1411 and a virtual memory share rank corresponding thereto are defined.

The VM Tier management program 302 determines the virtual CPU share rank and the virtual memory share rank using the virtual CPU share rank determination table 1400 and the virtual memory share rank determination table 1410 based on the virtual CPU allocation share and the virtual memory allocation share in the virtual resource information 11 for allocation to the new VM acquired from the hypervisor 9.

According to the present embodiment, the allocation share 1401/1411 and the share rank 1402/1412 are classified into three levels, but the number of classifications can be greater or smaller than three. Further, a different target can be adopted as the determination criteria, such as the number of connection ports of the storage system 12 other than the CPU and the memory, the path bandwidth of the network (kbps: kilo bits per second) or the storage capacity (GB: Giga Bytes). Further, it is also possible to acquire the amount of virtual resource allocated to each VM and to determine the rank based on the acquired amount of virtual resource instead of the allocation share, or to compute the share of each VM based on the sum of the amount of virtual resources. For example, if there are multiple host systems 2, the share rank of each VM per host system 2 can be determined by acquiring the amount of virtual resources allocated to each VM operated in each host system 2 and to compute the share of each VM based on the sum of the amount of virtual resources.

<VM Resource Share Rank Management Table>

FIG. 15 is a view showing a configuration example of the VM resource share rank management table. The VM resource share rank management table 1500 is a table for managing the gathering—determination result in a VM resource information gathering process (FIG. 16) described later. The VM resource share rank management table 1500 stores and manages the information related to the virtual CPU share rank 1502 and the virtual memory share rank 1503 with respect to each VM number 1501. The VM Tier determination information table 1500 is referred to by the VM Tier rank determination process 307 (FIG. 19) of the VM Tier management program 302 so as to determine the VM Tier rank.

<VM Resource Information Gathering Process>

Figure 16:
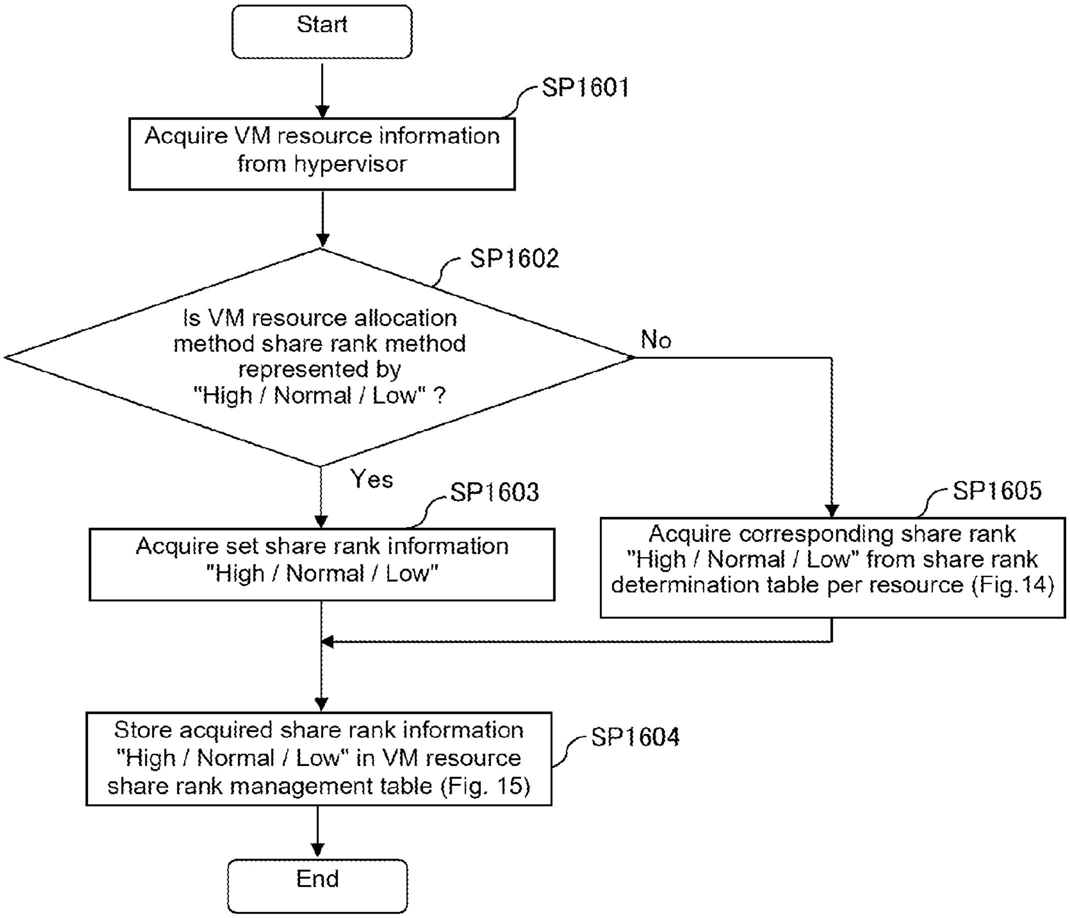
FIG. 16 is a flowchart showing a VM resource information gathering process.

FIG. 16 is a flowchart illustrating a process for gathering VM resource information. The VM resource information gathering process 306 (FIG. 3) acquires a virtual resource information to be allocated to the new VM (VM resource information 11) from the hypervisor 9, and stores the same in the VM resource share rank management table 1500.

At first, the VM Tier management program 302 acquires the virtual resource information to be allocated to the new VM (VM resource information 11) from the hypervisor 9 (SP1601).

The VM Tier management program 302 determines whether the VM resource allocation method based on the acquired virtual resource information for allocation to the new VM is of a share rank method represented by "High", "Normal" and "Low" (SP1602).

In the present invention, what is meant by share rank method is that the method represents the virtual memory capacity being allocated not as a quantitative information such as "2 GB" but as a qualitative information in which the share rank is "High", "Normal" or "Low", for example. According to the determination performed via the share rank method, it becomes possible to determine the amount of virtual resources to be used by the VM based on the overall resources based on the order of priority compared with other VMs 10 operating at the same time, so that the lack of or biased allocation capacity of storage resources to the VM 10 can be prevented.

If the method of allocation of virtual resources to the VM adopts a share rank method (SP1602: Yes), the VM Tier management program 302 acquires the information (high, normal, low) related to the share rank method (SP1603). Then, the VM Tier management program 302 stores the VM number in the acquired VM resource information 11, the acquired virtual CPU share rank and the virtual memory share rank in the respective entries of the VM resource share rank management table 1500 (SP1604). After storing the information, the VM Tier management program 302 ends the process.

If the method for allocating the virtual resource is not a share rank method (SP1602: No), the VM Tier management program 302 compares the VM resource information 11 (in the present embodiment, the share (%)) with the share rank determination table per resource (virtual CPU share rank determination table 1400 and virtual memory share rank determination table 1410), and acquires the share rank of each virtual resource (SP1605). Then, the VM Tier management program 302 stores the acquired VM number corresponding to the VM resource information 11, the acquired virtual CPU share rank and the virtual memory share rank to the respective entries of the VM resource share rank management table 1500 (SP1604). After storing the information, the VM Tier management program 302 ends the process.

According to the present embodiment, the share rank of the VM resource is determined based on the share (%) of virtual resource, but it is also possible to determine the same based on the actual amount of allocation instead of the share. Furthermore, the VM resource share rank can be classified based on the information on the OS and application installed in the VM in addition to the information related to the amount of virtual resources, or can be classified independent from the amount of virtual resources.

Further, it is possible to determine the VM allocation resource share rank by acquiring the amount of virtual resources of all VMs operating in the multiple host systems (from host system 2 to host system 2*n*) and to compute the percentage with respect to the overall virtual resources.

<<Determination of VM Tier Rank>>

<VM Tier Rank Determination Table>

FIG. 17 is a view showing a configuration example of a VM Tier rank determination table. The VM Tier rank determination table 1700 is a table for determining a Tier rank 1710 of each VM 10 based on a virtual memory share rank 1701 and a virtual CPU share rank 1702 of each VM 10.

According to the present embodiment, a VM Tier rank determination table 1700, from which the VM Tier rank is acquired, constitutes three levels of virtual memory share ranks 1701 and three levels of virtual CPU share ranks 1702. However, the VM Tier rank determination table 1700 can be any table based on the classifications of the virtual CPU share rank and the virtual memory share rank, and the VM Tier rank 1710 can be determined based on the virtual CPU share rank classified into two or four or more levels and the virtual memory share rank classified into two or four or more levels.

Further according to the present embodiment, the VM Tier rank 1710 is classified into five classifications, which are Tier 0, Tier 0.5, Tier 1, Tier 1.5, and Tier 2, but the number of classifications can be greater or smaller than five. In the present embodiment, the VM Tier rank 1710 is determined and obtained via the virtual memory share rank 1701 and the virtual CPU share rank 1702, but the VM Tier rank can be determined based on other virtual resource share ranks (such as the operation frequency of the CPU, the number of connection ports to the storage system 13, the path bandwidth of the connection network, and so on).

<VM Tier Rank Management Table>

Figures 19, 20:
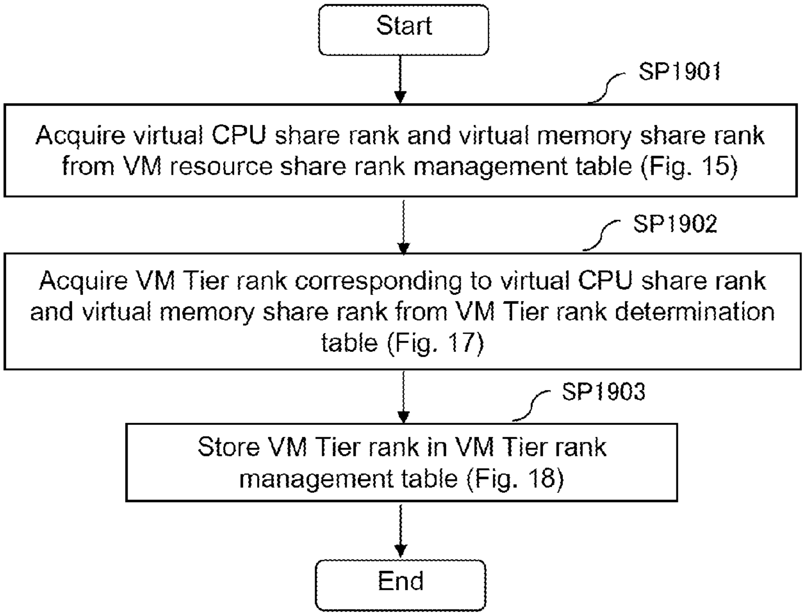
FIG. 19 is a flowchart showing a VM Tier rank determination process.
FIG. 20 is a view showing a configuration example of a volume layout table.

FIG. 18 is a view showing a configuration example of a VM Tier rank management table. The VM Tier rank management table 1800 is a table for managing the VM Tier rank being ranked via the VM Tier rank determination process 307 of SP508 (FIG. 5) (the actual operation is illustrated in the flowchart of FIG. 19) together with the share ranks of the virtual CPU and the virtual memory.

In the VM Tier rank management table 1800, the information related to the virtual CPU share rank 1802, the virtual memory share rank 1803 and the VM Tier rank 1804 is stored and managed with respect to each VM number 1801. The contents of the VM resource share rank management table can be set in the VM Tier rank management table 1800.

The VM Tier rank 1804 is obtained by the VM Tier management program 302 verifying the virtual CPU share rank 1802 and the virtual memory share rank 1803 with the VM Tier rank determination table 1700.

An allocation LU Tier rank determination process 308 (FIG. 21) of the volume management program 303 described later refers to the VM Tier rank management table 1800 to determine the LU Tier rank of the storage resource being allocated to the VM.

<VM Tier Rank Determination Process>

FIG. 19 is a flowchart showing the determination process of the VM Tier rank. The VM Tier rank determination process 307 is a process executed subsequent to the VM resource information gathering process (FIG. 16), which determines the VM Tier rank and stores the rank in the VM Tier rank management table 1800.

At first, the VM Tier management program 302 acquires based on the VM resource share rank management table 1500 (FIG. 15) the virtual CPU share rank and the virtual memory share rank in VM 10 for determining the VM Tier rank (SP1901).

Next, the VM Tier management program 302 finds a VM Tier rank that matches both the virtual CPU share rank and the virtual memory share rank in the VM Tier rank determination table 1700 (SP1902).

The VM Tier management program 302 stores in the VM Tier rank management table 1800 the VM Tier rank and the corresponding VM number, the virtual CPU share rank and the virtual memory share rank, and ends the process (SP1903).

By executing the processes from SP1901 to SP1903, it becomes possible to determine the VM Tier rank of VM 10.

(3-3) Determination of Allocation LU Tier Rank—Volume Layout

<Volume Layout Table>

FIG. 20 is a view showing a configuration example of a volume layout table. The volume layout table 2000 is a table for managing the share rank of the virtual resource, the VM Tier rank, the LU Tier rank and the storage destination LU number (the LU group constituting the logical volume provided to the host system 2) with respect to each VM 10 for providing a virtual storage resource to the VM.

The volume layout table 2000 is a table created and managed via the allocation LU Tier rank determination process 308 (SP509 of FIG. 5) and the volume layout process 309 (SP510 of FIG. 5) of the volume management program 303.

The volume layout table 2000 is composed of a VM number 2001 for identifying the VM 10, a virtual CPU share rank 2002, a virtual memory share rank 2033, a VM Tier rank 2004, an LU Tier rank 2005, and a storage destination LU number 2006.

Figure 21:
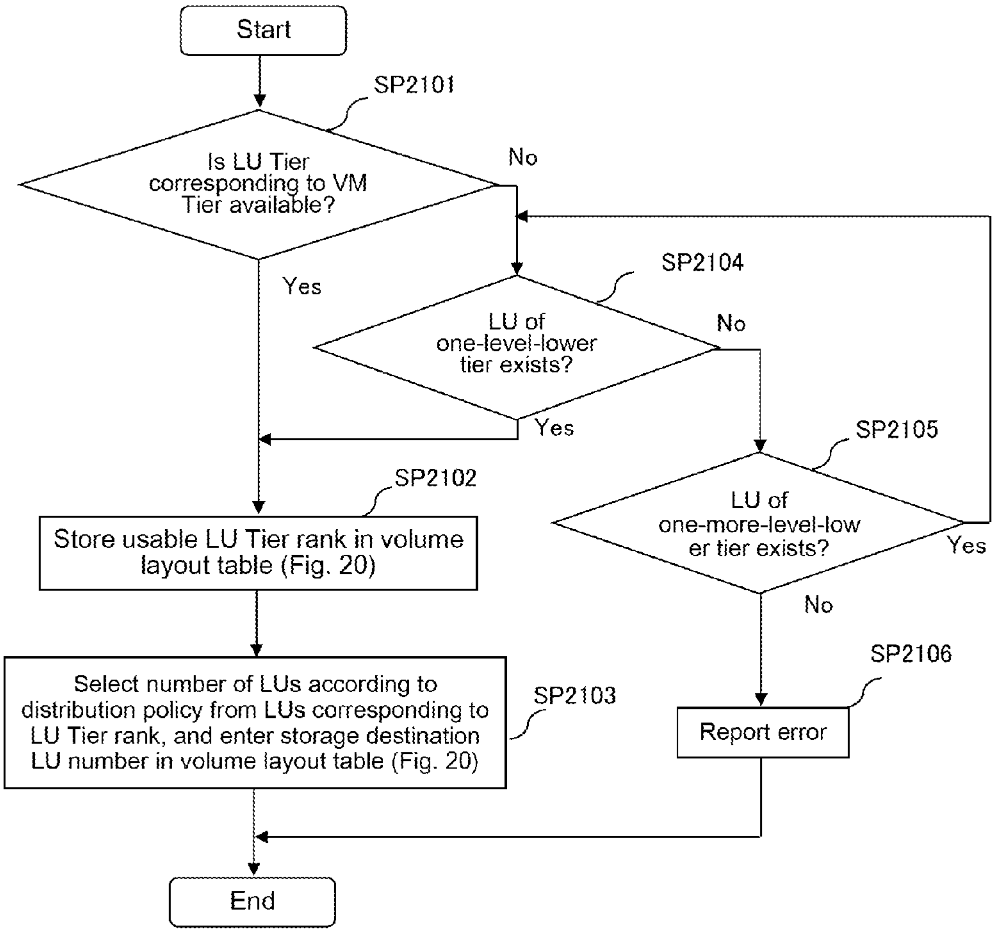
FIG. 21 is a flowchart showing an LU Tier rank determination process and a volume layout generation—update process.

The LU Tier rank 2005 is a Tier rank of the usable LU determined based on an allocation LU Tier rank determination process—volume layout process shown in FIG. 21.

A storage destination LU number 2006 is an LU information selected based on a distribution storage layout policy (hereinafter referred to as distribution policy) similarly according to the allocation LU Tier rank determination process—volume layout process of FIG. 21.

The present embodiment illustrates an example of applying a distribution policy in which data is divided into parts having the same sizes and storing the same in a distributed manner to three LUs having the same Tier rank. Therefore, information of three different LU numbers is stored in each entry of the storage destination LU number 2006. The number of LUs storing the data in a distributed manner can be greater or smaller than three. It is also possible to adopt other distribution policies, such as a distribution policy for storing the data in different sizes in the respective LUs, or a distribution policy of determining the storage destination by assembling LUs of different Tier ranks. Furthermore, the same LU can be shared and used among multiple VMs 10 (such as the "LU15" of rows 2012 and 2014 of FIG. 20).

As shown in the volume layout table, each VM is allocated thereto a virtual storage resource (shown by the LU Tier rank) formed from LUs of the storage tier corresponding to the VM characteristics (shown by the VM Tier rank).

<LU Tier Rank Determination Process and Volume Layout Generation—Update Process>

FIG. 21 is a flowchart showing a LU Tier rank determination process and a volume layout generation—update process. This allocation LU Tier rank determination process 308 (SP509) and the volume layout process 309 (SP510) is executed by the volume management program 303 of the metadata server 5 after the VM Tier rank determination process 307 (SP508) has been completed. Thereafter, when volume layout has been completed, the metadata server 5 returns a storage resource allocation response for the new VM to the hypervisor 9 of the host system 2, and provides the virtual storage resource subjected to layout to the VM 10.

At first, the volume management program 303 refers to the LU Tier rank management table 1200 and the VM Tier rank management table 1800, and determines whether the LU 12 of the same rank as the Tier rank of each VM 10 is available or not (SP2101). For example, if the VM Tier rank 1804 of the VM 10 is "Tier 0.5", the volume management program 303 selects an LU where the LU Tier rank 1204 is "Tier 0.5".

Next, if an LU of a Tier corresponding to the VM Tier is available (SP2101: Yes), the volume management program 303 stores the LU Tier rank in the Tier rank 2005 of the volume layout table 2000 (SP2102).

Then, the volume management program 303 selects one or more of LUs corresponding to the distribution policy in the distributed file system out of the LUs corresponding to the LU Tier rank, stores the LU numbers of the LUs being selected in the storage destination LU number 2006 of the volume layout table 2000, and ends the process (SP2103).

By the processes from SP2101 to SP2103, it becomes possible to compose LU groups (volumes) with an LU Tier rank 2005 satisfying the VM Tier rank 2004, as shown in rows 2011, 2012 and 2013.

If the LU of the Tier corresponding to the Tier of the VM is not available (SP2101: No), the volume management program 303 determines whether the LU of a one-level-lower tier (in which the Tier rank is one level higher, that is, Tier 0.5 if the corresponding tier is Tier 0) is available or not (SP2104).

If the LU of a one-level-lower tier is in an available state (SP2104: Yes), the volume management program 303 executes recording the LU Tier rank in SP2102, selecting the LU in SP2103, and recording the same to the volume layout table.

Based on the process from SP2101 to SP2104 shown above, it becomes possible to constitute the LU group (volume) having the LU Tier rank that substantially satisfies the VM Tier rank 2004 as shown in row 2014.

If the LU of a one-level-lower tier is not available (SP2104: No), the volume management program 303 confirms whether there exists an LU of a one-more-level-lower tier or not (SP2105).

If the LU of a one-more-level-lower tier exists (SP2105: Yes), the volume management program 303 re-executes the process of SP2104, and determines whether that LU of a one-level-lower tier is available or not.

If the LU of a one-more-level-lower tier does not exist (SP2105: No), the volume management program 303 outputs an error report, and ends the process (SP2106). The method for reporting error can be an error display on the output device 53 of the metadata server 5, or an error transmission to the host system 2.

By executing the processes from SP2101 to SP2106, it becomes possible to determine the Tier rank of the LU and the layout of the volume to be provided to the VM 10.

As described, the present invention enables to provide a network system in which storage resources matching the characteristics of the storage systems 13 constituting the data storage 3 or/and the characteristics of the storage media 12 mounted to the storage systems 13 can be provided appropriately in correspondence with the characteristics of the host system 2. Further according to the present invention, even in an environment where a server virtualization structured is adopted in the host system 2, a storage resource matching the characteristics of the VM 10 operating in the host system 2 can be allocated to the VM 10. Thus, the present invention enables to realize efficient and effective use of storage resources.

Embodiment 2

(4) Configuration of Network System according to Embodiment 2

Next, the network system according to the second embodiment of the present invention will be described with reference to FIGS. 22 and 23. In the drawings of embodiment 2, the same components as embodiment 1 are denoted with the same reference numbers, and mainly the differences with embodiment 1 are described herein.

Figure 22:
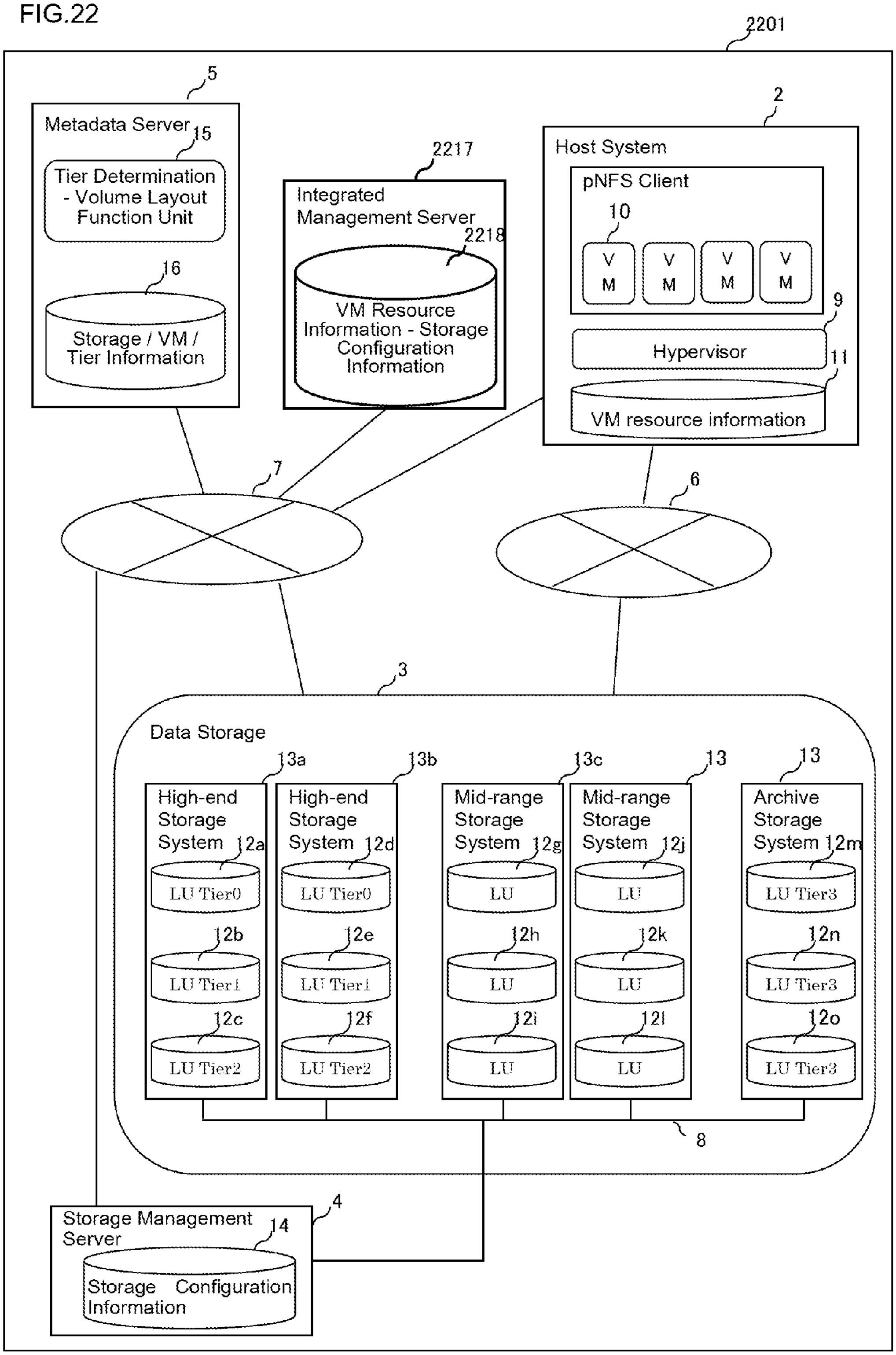
FIG. 22 is a configuration example of a network system according to a second embodiment of the present invention.

FIG. 22 is a view showing a configuration example of a network system according to embodiment 2 of the present invention. The characteristic feature of network system 2201 according to embodiment 2 of the present invention is that an integrated management server 2217 is added to the network system 1 according to embodiment 1.

An integrated management server 2217 is a computer system having a similar internal configuration as the metadata server 5, and made up by, for example, a PC, a mainframe or a server. Further, the integrated management server 2217 is connected to the host system 2, the storage system 13, the storage management server 4 and the metadata server 5 via a network 7.

In the prior art network system, the types and amounts of various virtual resources (such as the virtual CPU, the virtual memory, the virtual storage and the virtual path) allocated to the VM 10 were determined independently in the host system 2, the storage system 13 and the network device (not shown) and provided to the VM 10. Therefore, the allocation to the VM 10 required much time, and the characteristics of the respective devices providing the virtual resources could not be utilized effectively, so that it was not possible for the VM to realize a high processing performance.

In the present embodiment, the types and amounts of various virtual resources to be allocated to the VM 10 are integrally determined and managed by the integrated management server 2217.

The integrated management server 2217 stores therein the storage configuration information 14 that the metadata server 5 had acquired from the storage management server 4 and the VM resource information 11 that the metadata server 5 had acquired from the hypervisor 9 in the network system 1 of embodiment 1 as a VM resource information—storage configuration information 2218.

In the network system 2201, the information that the metadata server 5 had requested and acquired from the storage management server 4 and the hypervisor 9 in the network system 1 of embodiment 1 is requested and acquired from the integrated management server 2217, so that in the network system of the present embodiment, the virtual storage resource formed from the storage tier volume corresponding to the VM characteristics can be allocated to the VM.

(4-1) Allocation of Virtual Storage Resource to VM

Figure 23:
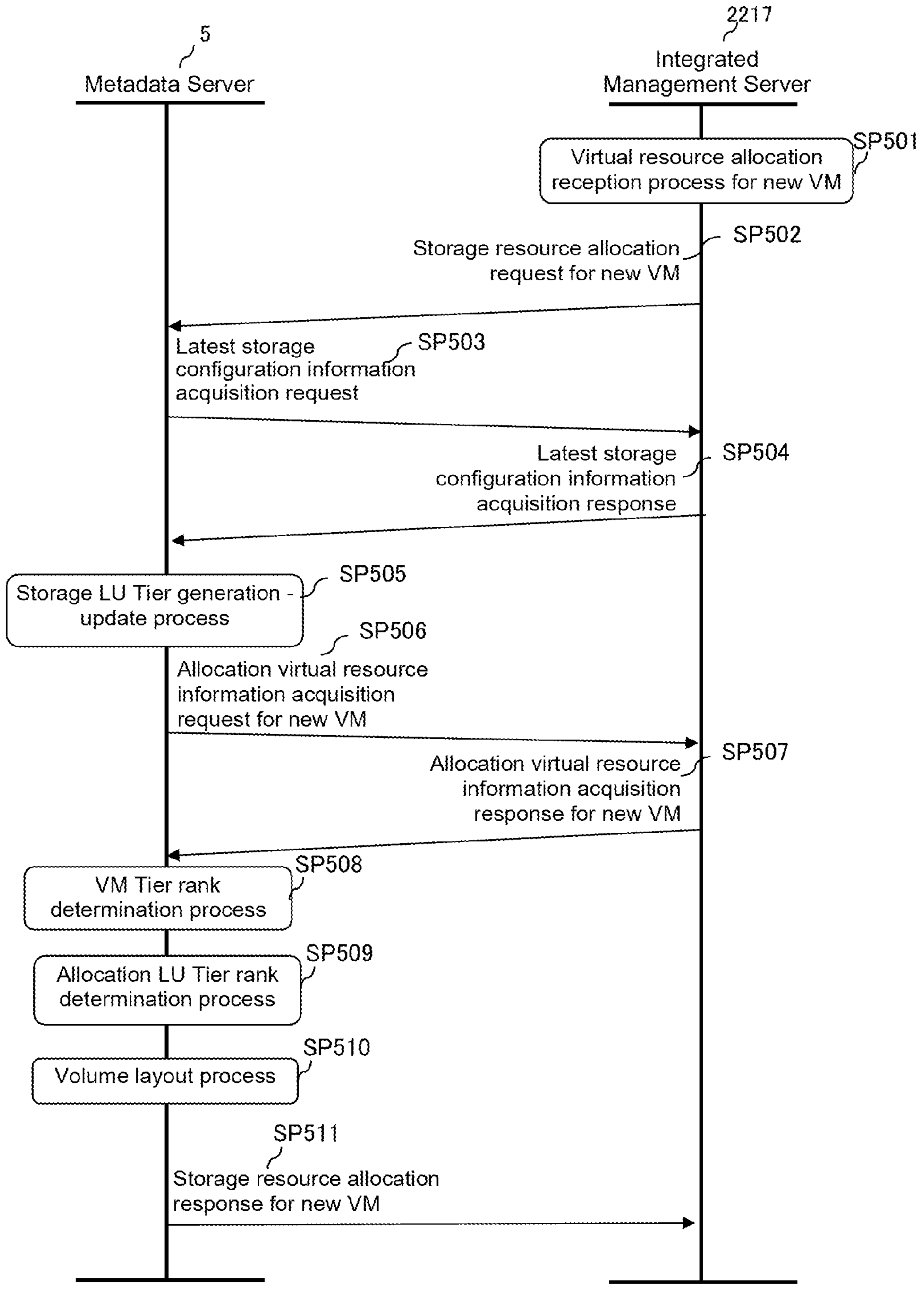
FIG. 23 is a sequence chart showing the process for allocating storage resources to VMs according to the second embodiment of the present invention.

FIG. 23 is a sequence chart showing the process for allocating a storage resource to a VM according to the second embodiment of the present invention. The processes that had been performed by the hypervisor 9 and the storage management server 4 in the host system 2 in FIG. 5 will be performed by the integrated management server 2217. Prior to starting the storage resource allocation process to VM 10, the integrated management server 2217 acquires the VM resource information 11 from the host system 2 and the storage configuration information 14 from the storage management server 4 in advance, and stores the same within the device as VM resource—storage configuration information 2218. Further, the VM resource—storage configuration information 2218 can be acquired at the timing of starting the storage resource allocation process to the VM 10, or a process to acquire the information can be executed periodically.

When a request to allocate a virtual storage resource to a newly created VM is received from the hypervisor 9 of the host system 2 in SP501, the integrated management server 2217 executes the storage resource allocation process to VM 10.

When a storage resource allocation response for a new VM is received from the metadata server 5 in SP511, the integrated management server 2217 transmits the volume layout information to the host system 2, and provides virtual storage resources to the VM 10.

According to the network system 2201 of the present embodiment, similar to embodiment 1, a storage resource corresponding to the characteristics of the storage system 13 constituting the data storage 3 and the characteristics of the storage media 12 mounted to the storage system can be appropriately provided to the host system 2. Further according to the present invention, a storage resource corresponding to the characteristics of the VM 10 operating in the host system 2 can be allocated appropriately to the VM 10 in an environment adopting a server virtualization structure to the host system 2. In addition, the integrated management server 2217 can collectively execute the processes and management of various information for providing the storage resources to the VM 10, so that the allocation processing can be performed speedily.

Embodiment 3

(5) Configuration of Network System according to Embodiment 3

Figure 24:
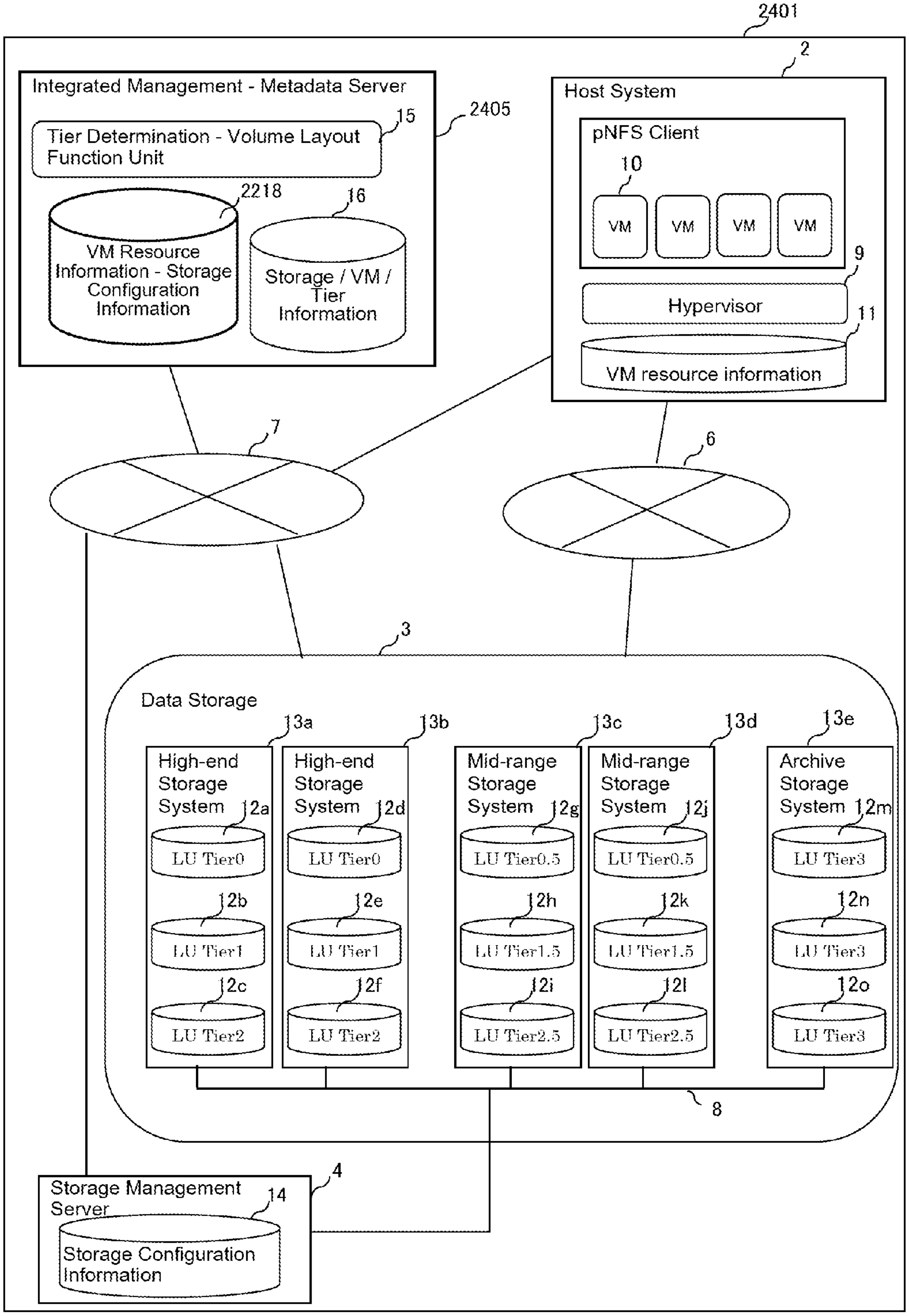
FIG. 24 is a view showing a configuration example of a network system according to a third embodiment of the present invention.

FIG. 24 is a view showing a configuration example of the network system according to embodiment 3 of the present invention. Next, the network system according to embodiment 3 of the present invention will be described with reference to FIG. 24. In the drawing of embodiment 3, the same components as embodiments 1 and 2 are denoted with the same reference numbers, and mainly the differences from embodiments 1 and 2 are described.

In the network system 2201 according to embodiment 2, the metadata server 5 and the integrated management server 2217 are operated as independent computer systems, but in a network system 2401 according to embodiment 3, the metadata server 5 and the integrated management server 2217 are integrated as a computer system, that is, an integrated management—metadata server 2405, executes the process for allocating storage resources to the VM 10.

The integrated management—metadata server 2405 is a computer system having a similar internal configuration as the integrated management server 2217 or the metadata server 5, and made up by a PC, a mainframe, a server or the like. The integrated management—metadata server 2405 is connected to the host system 2, the storage system 13, and the storage management server 4 are connected via a second network 7.

The integrated management—metadata server 2405 is capable of allocating a virtual storage resource formed from a storage tier volume that matches the VM characteristics to the VM 10 via a similar process as embodiment 2.

Embodiment 4

(6) Configuration of Network System according to Embodiment 4

Next, the network system according to embodiment 4 of the present invention will be described with reference to FIG. 25. In the drawing of embodiment 4, the components equivalent to those of embodiments 1, 2 and 3 are denoted with the same reference numbers, and mainly the differences from embodiments 1, 2 and 3 will be described.

Figure 25:
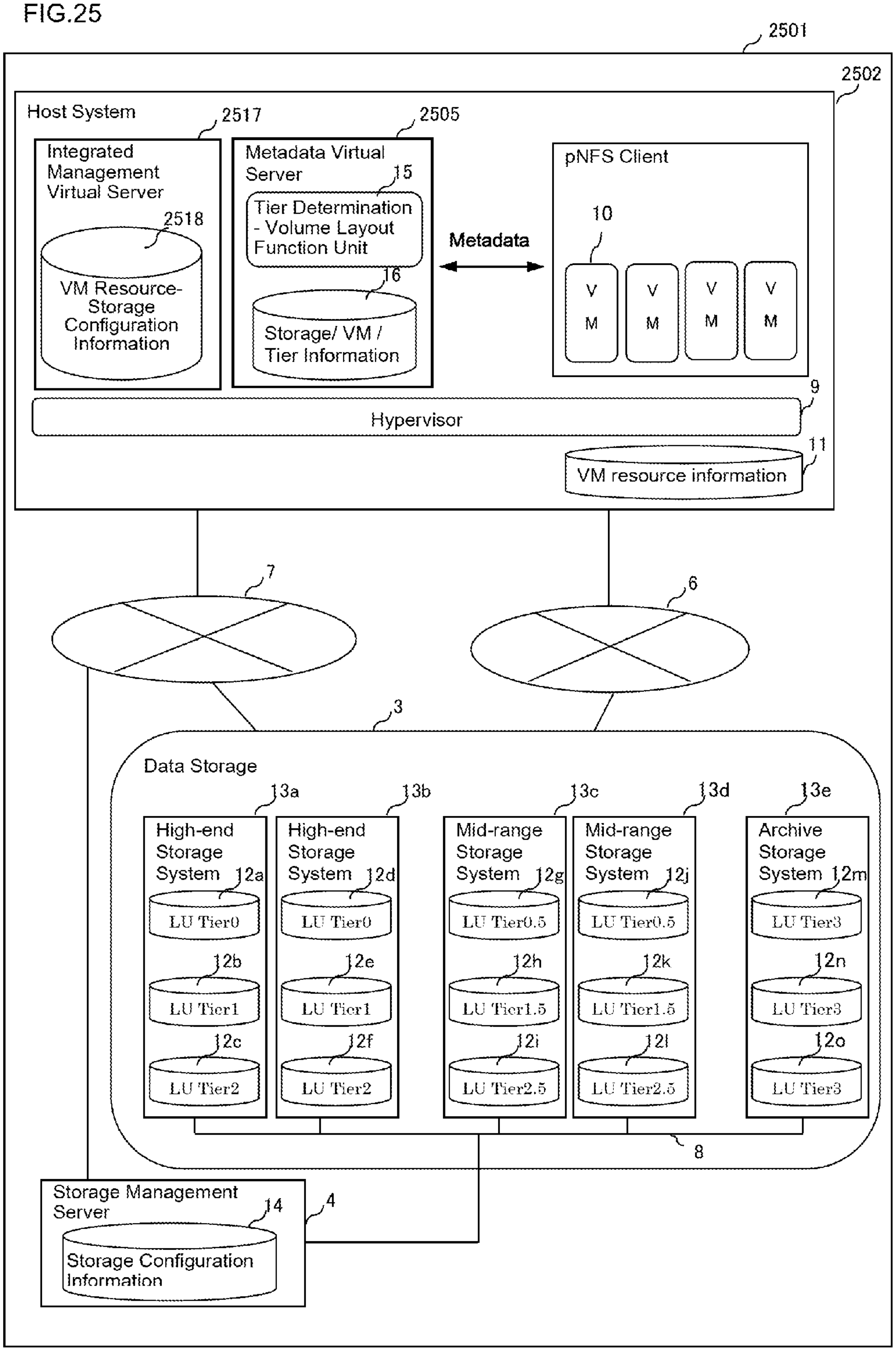
FIG. 25 is a view showing a configuration example of a network system according to a fourth embodiment of the present invention.

FIG. 25 is a view showing a configuration example of the network system according to embodiment 4 of the present invention. In the network system 2201 according to embodiment 2, the metadata server 5 and the integrated management server 2217 are operated by different physical computer systems. According to the network system 2401 of embodiment 3, the computer system having integrated the metadata server 5 and the integrated management server 2217, that is, the integrated management—metadata server 2405, executes the process for allocating storage resources to the VM 10.

According to the network system 2501 of embodiment 4, the metadata server 5 and the integrated management server 2217 operates as virtual servers on the hypervisor 9 of the host system 2, that is, as a metadata virtual server 2505 and an integrated management server 2517.

By the metadata virtual server 2505 and the integrated management virtual server 2517 executing the same processes as the metadata server 5 and the integrated management server 2217 of the network system 2201 according to embodiment 2, the virtual storage resources formed from the storage tier volume corresponding to the VM characteristics similar to embodiments 1 through 3 can be allocated appropriately to the VM 10.

The present invention is not restricted to the above-illustrated preferred embodiments, and can include various modifications. The above-illustrated embodiments are mere examples for describing the present invention in detail, and they are not intended to restrict the present invention to include all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations.

Furthermore, a portion or whole of the above-illustrated configurations, functions, processing units, processing means and so on can be realized via a hardware configuration such as by designing an integrated circuit. Further, the configurations and functions illustrated above can be realized via software by the processor interpreting and executing programs realizing the respective functions.

The information such as the programs, tables and files for realizing the respective functions can be stored in a storage device such as a memory, a hard disk drive or a SSD (Solid State Drive), or in a memory media such as an IC card, an SD card or a DVD.

Further, only the control lines and information lines considered necessary for description are illustrated in the drawings, and not necessarily all the control lines and information lines required for production are illustrated. In actual application, almost all the configurations are mutually coupled.

REFERENCE SIGNS LIST

1 Network system
2 Host system
3 Data storage
4 Storage management server
5 Metadata server
6, 7, 8 Network
9 Hypervisor
10 VM
11 VM resource information
12 LU
13 Storage system
14 Storage configuration information
15 Tier determination—volume layout function unit
16 Storage/VM/Tier information
201 Storage media
202 Storage media group
301 Storage LU Tier management program
302 VM Tier management program
303 Volume management program
304 Storage configuration information gathering process
305 Storage LU Tier generation—update process
306 VM resource information gathering process
307 VM Tier rank determination process
308 Allocation LU Tier rank determination process
309 Volume layout process
700 Model rank determination table
800 LU rank management table
1100 LU Tier rank determination table
1200 LU Tier rank management table
1400 Virtual CPU share rank determination table
1410 Virtual memory share rank determination table
1500 VM resource share rank management table
1700 VM Tier rank determination table
1800 VM Tier rank management table
2000 Volume layout table
2201, 2401, 2501 Network system
2217 Integrated management server
2218 Resource—device configuration information
2405 Integrated management—metadata server
2502 Host system
2505 Metadata virtual server
2517 Integrated management virtual server

The invention claimed is:

1. A network system, comprising:

a first control unit; and a data storage system providing a plurality of sub storage areas (LUs) having different storage characteristics to a host system;

wherein the data storage system comprises a plurality of storage systems, and the storage system has a plurality of storage media mounted thereto, and a storage configuration information comprises a model information indicating a type of the storage system, and a media information indicating a type of the storage media being mounted;

wherein the host system has a second control unit, and one or more virtual machines controlled by the second control unit is operated, having virtual machine resources allocated to each virtual machine;

wherein the first control unit:

acquires information on the virtual machine resources;

determines the storage characteristics of the sub storage area to be allocated to the virtual machine based on the virtual machine resource information;

constitutes a data storage area (volume) from the plurality of sub storage areas having the same storage characteristics;

determines a model rank for each storage system based on the model information, and determines a media rank of each storage media based on the media information; and computes a storage characteristics (LU Tier rank) of the sub storage area formed from the plurality of storage media based on the model rank and the media rank; and stores the data of the virtual machine to the data storage area;

wherein the data of the virtual machine is distributed and stored in the data storage area;

wherein the host system further comprises a plurality of CPU units for executing processes, a memory unit having a determined storage capacity, a communication unit having multiple paths for connecting to the data storage system, and a storage unit for storing information;

the virtual machine resource information is stored in the storage unit;

wherein either the virtual machine resource information comprises one or more of the following information allocated to the virtual machine:

(a1) number of virtual CPUs, (a2) frequency of operation of a virtual CPU, (a3) storage capacity of the virtual memory, (a4) number of virtual connection ports, and (a5) bandwidth of virtual communication path;

or the virtual machine resource information comprises one or more of the following information allocated to the virtual machine:

(b1) ratio of number of virtual CPUs being allocated to the total number of virtual CPUs, (b2) ratio of operation frequency being allocated to the overall operation frequency of the virtual CPUs, (b3) ratio of allocated storage capacity to a total storage capacity of the virtual memory, (b4) ratio of number of allocated ports to a total number of virtual connection ports, and (b5) ratio of allocated bandwidth to the bandwidth of the virtual communication path.

2. The network system according to claim 1, wherein the first control unit computes the virtual machine characteristics (VM Tier rank) based on the virtual machine resource information.

3. The network system according to claim 2, wherein the first control unit determines the storage characteristics (LU Tier rank) of the sub storage area allocated to the virtual machine based on a corresponding relationship determined in advance from the virtual machine characteristics.

4. The network system according to claim 3, wherein the network system further comprises a metadata server, and the first control unit is mounted to the metadata server.

5. The network system according to claim 4, wherein the network system further comprises a storage management server, and the storage configuration information of the data storage system is acquired by the first control unit of the meta data server via the storage management server.

6. The network system according to claim 4, wherein the network system further comprises a storage management server and an integrated management server; and the storage configuration information of the data storage system acquired by the storage management server and the virtual machine resource information are acquired by the first control unit of the metadata server via the integrated management server.

7. The network system according to claim 3, wherein the network system further comprises a storage management server and an integrated management—metadata server;

the integrated management—metadata server has a first control unit mounted thereto; and the storage configuration information of the data storage system acquired by the storage management server and the virtual machine resource information are acquired by the first control unit of the integrated management—meta data server.

8. The network system according to claim 3, wherein the host system has one or more virtual servers controlled by the second control unit operated therein; and the virtual server:

acquires the virtual machine resource information and the storage configuration information;

determines a storage characteristics of the sub storage area allocated to the virtual machine based on the virtual machine resource information;

forms a data storage area (volume) from the plurality of sub storage areas having the same storage characteristics; and the data stored in the data storage area is stored in a distributed manner in the sub storage areas.

9. A method for operating a network system providing a storage area, the network system including:

a first control unit; and a data storage system providing a plurality of sub storage areas (LUs) having different storage characteristics to a host system;

wherein the data storage system comprises a plurality of storage systems, and the storage system has a plurality of storage media mounted thereto, and a storage configuration information comprises a model information indicating a type of the storage system, and a media information indicating a type of the storage media being mounted;

wherein the host system has a second control unit, and one or more virtual machines controlled by the second control unit is operated, having virtual machine resources allocated to each virtual machine;

the method implemented in the first control unit, the method comprising:

acquiring a storage configuration information of a device providing the storage area;

classifying a plurality of sub storage areas having different storage characteristics to a plurality of sub storage areas having a same storage characteristics based on the storage configuration information;

acquiring information on the virtual machine resources determining storage characteristics of the sub storage areas allocated to the virtual machine based on the virtual machine resource information;

constituting a data storage area (volume) from the plurality of allocated sub storage areas having the same storage characteristics;

determining a model rank for each storage system based on the model information, and determining a media rank of each storage media based on the media information;

computing a storage characteristics (LU Tier rank) of the sub storage area formed from the plurality of storage media based on the model rank and the media rank; and storing data of the virtual machine to the data storage area (volume);

wherein the data of the virtual machine is distributed and stored in the data storage area;

wherein the host system further comprises a plurality of CPU units for executing processes, a memory unit having a determined storage capacity, a communication unit having multiple paths for connecting to the data storage system, and a storage unit for storing information;

wherein the virtual machine resource information is stored in the storage unit;

wherein either the virtual machine resource information comprises one or more of the following information allocated to the virtual machine:

(a1) number of virtual CPUs, (a2) frequency of operation of a virtual CPU, (a3) storage capacity of the virtual memory, (a4) number of virtual connection ports, and (a5) bandwidth of a virtual communication path;

or the virtual machine resource information comprises one or more of the following information allocated to the virtual machine:

(b1) ratio of number of virtual CPUs being allocated to the total number of virtual CPUs, (b2) ratio of operation frequency being allocated to the overall operation frequency of the virtual CPUs, (b3) ratio of allocated storage capacity to a total storage capacity of the virtual memory, (b4) ratio of number of allocated ports to a total number of virtual connection ports, and (b5) ratio of allocated bandwidth to the bandwidth of the virtual communication path.

10. The method for operating a network system according to claim 9, wherein the data is stored in a distributed manner to the sub storage area of the data storage area.

* * * * *